United States Patent
Nielsen

[19]

[11] Patent Number: 6,019,198

[45] Date of Patent: Feb. 1, 2000

[54] MECHANICALLY DRIVEN RATCHET ASSEMBLY

[75] Inventor: Roger B. Nielsen, Meridian, Id.

[73] Assignee: Preo New Products Corp., Boise, Id.

[21] Appl. No.: 08/987,369

[22] Filed: Dec. 9, 1997

[51] Int. Cl.[7] .............................. B60T 1/00; F16D 63/00; G05G 1/00; B65H 75/30

[52] U.S. Cl. ..................... 188/31; 74/577 R; 188/82.7; 188/265; 191/12.2 R; 242/384.5; 242/385.1; 242/385.3

[58] Field of Search ............................. 242/384.5, 383.4, 242/384.2, 382.1, 385.3, 385.1, 385, 373, 385.4, 385.2; 191/12.2 R; 74/577 R; 188/31, 30, 60, 265, 61, 82.1, 82.3, 82.7, 82.74, 82.77; 192/46, 43.1, 28, 33 R

[56] References Cited

U.S. PATENT DOCUMENTS

| | | | |
|---|---|---|---|
| 2,375,917 | 5/1945 | Gross | 242/7 |
| 2,530,773 | 11/1950 | Johnson et al. | 191/12.4 |
| 2,698,146 | 12/1954 | Becker | 242/107 |
| 3,059,500 | 10/1962 | Schneiter | 188/82.74 |
| 3,432,623 | 3/1969 | Blanch et al. | 191/12.2 |
| 3,490,715 | 1/1970 | Nicpon | 242/107.7 |
| 3,590,656 | 7/1971 | Lloyd, Jr. | 188/82.7 |
| 3,619,518 | 11/1971 | Blanch | 191/12.2 R |
| 3,670,855 | 6/1972 | Lemery | 188/82.7 |
| 3,715,526 | 2/1973 | Blanch et al. | 191/12.2 R |
| 3,795,075 | 3/1974 | Oreachowski | 188/82.7 |
| 3,808,382 | 4/1974 | Blanch et al. | 191/12.2 R |
| 3,834,645 | 9/1974 | Morishige | 188/82.7 |
| 4,027,550 | 6/1977 | Yaguinuma | 188/82.77 |
| 4,350,850 | 9/1982 | Kovacik et al. | 191/12.2 R |
| 4,364,528 | 12/1982 | Yanagihara | 242/107.7 |
| 4,505,167 | 3/1985 | Nicolaus | 188/82.77 |
| 4,684,077 | 8/1987 | Kurtti et al. | 242/384.2 |
| 4,725,697 | 2/1988 | Kovacik et al. | 191/12.4 |
| 4,726,538 | 2/1988 | Kovacik et al. | 242/107 |
| 4,774,647 | 9/1988 | Kovacik et al. | 362/295 |
| 4,948,066 | 8/1990 | Matsumoto et al. | 242/384.5 |
| 5,485,971 | 1/1996 | Nakaya et al. | 242/383.4 |
| 5,622,327 | 4/1997 | Heath et al. | 242/383.4 |

*Primary Examiner*—Douglas C. Butler
*Attorney, Agent, or Firm*—Frank J. Dykas; Robert L. Shaver

[57] ABSTRACT

A mechanically driven ratchet assembly which has a pawl gear attached to a rotationally biased shaft, a pawl assembly having a pawl tooth for engagement with a pawl gear, and a ratchet gear which alternately permits movement when driven by the pawl gear of the pawl assembly from a first position to a third position in which full rotation of the shaft, in the direction of the rotational bias, was permitted, and sequentially and alternatively permits rotation of the pawl assembly either from the first position to a second position where the pawl tooth remains engaged with the teeth of the pawl gear or to a third position where the pawl tooth is no longer engaged with the pawl gear.

10 Claims, 25 Drawing Sheets

MECHANICALLY DRIVEN RATCHET ASSEMBLY

BACKGROUND OF THE INVENTION

1. Technical Field

This invention generally relates to ratchet assemblies for use with rotationally biased take up reels, spools or shafts, and more particularly to a ratchet assembly wherein a pawl gear is released from engagement or held in engagement, with the spool shaft pawl gear by means of a mechanically driven ratchet gear.

2. Background

In its most basic format, the ratchet assemblies used in the prior art are typically configured to include a ratchet gear attached to a spring loaded shaft, and a pawl attached to a stationery housing and spring loaded to engage with the teeth of the ratchet gear so as to permit rotation of the ratchet gear in one direction and prohibit rotation in the other by engagement with a tooth of the ratchet gear. The release mechanism for the pawl is typically, in the prior art, either a mechanical release mechanism typically including some sort of a handle operable by the operator to lift the pawl gear out of engagement with the ratchet gear, or some sort of a centrifugal force mechanism to hold the pawl out of engagement with the ratchet gear when the pawl gear and the shaft are being rotated quickly. For example, the mechanism found on the common window shade is usually a centrifugal force mechanism.

Common examples of these prior art configurations are found in: U.S. Pat. No. 2,530,773 to Johnson et al.; and U.S. Pat. No. 2,698,146 to Becker, as well as all of the other cited prior art.

All of these suffer from the same limitations, in that they either must have some sort of manual release mechanism for holding the pawl out of engagement with the ratchet gear, or the rotational speed of retraction of the spring loaded spool must be sufficiently fast to induce sufficient centrifugal forces to hold the pawl out of engagement.

What is needed is a mechanically driven ratchet assembly which automatically induces rotational motion in a ratchet gear to permit withdrawal of line or cordage from the spool to either a locked position or a retraction position without the need for any manual release mechanism or centrifugal force to overcome the engagement of a spring loaded pawl with a ratchet gear.

DISCLOSURE OF INVENTION

These objects are achieved in a mechanically driven ratchet assembly which has a pawl gear for attachment to a rotationally biased shaft, a pawl assembly having a pawl tooth for engagement with the pawl gear, and a ratchet gear which alternately permits movement, driven by the pawl gear, of the pawl assembly from a first position to a third position in which full rotation of the rotationally biased shaft is permitted, and sequentially, and alternatively, permits rotation of the pawl assembly either from the first position to a second position wherein the pawl tooth remains engaged with the teeth of the pawl gear and prohibits rotation of the shaft or the third position. It will always permit rotation of the pawl assembly back to the first position wherein rotation of the shaft against this rotational bias is permitted.

This is accomplished by the use of a free-wheeling ratchet gear inter-engaging with a drive pin and a combination drive and lock pin which are attached to the pawl assembly. When the pawl assembly rests in the third position and it begins to be rotated in the direction toward the first position, the drive pin will engage the ratchet gear and push itself into either a drive slot or a combination drive and locking slot to rotate the ratchet gear one drive slot notch. When the rotation of the pawl gear is reversed to move in a direction from the first position back toward the third position, the combination drive and locking pin will engage either one or the other of a series of alternating drive slots and combination drive and locking slots. If it engages a drive slot, the pawl assembly is permitted to move from the first position to the third position. If it engages a combination drive and locking slot, because of the configuration of the combination drive and locking slot, it will engage a stop surface and hold the pawl assembly in the second, engaged position.

When the pawl gear is again rotated so as to arcuately rotate the pawl assembly back from the second position to the first position, the drive pin will again engage either a drive slot or a combination drive and lock slot and will thereby rotate the ratchet gear to position the next alternating drive or combination drive and lock slot in a position where it will engage the combination drive and locking pin to permit full rotation of the pawl assembly back from the first position to the third position.

BEST MODE FOR CARRYING OUT INVENTION

Figure 1A:
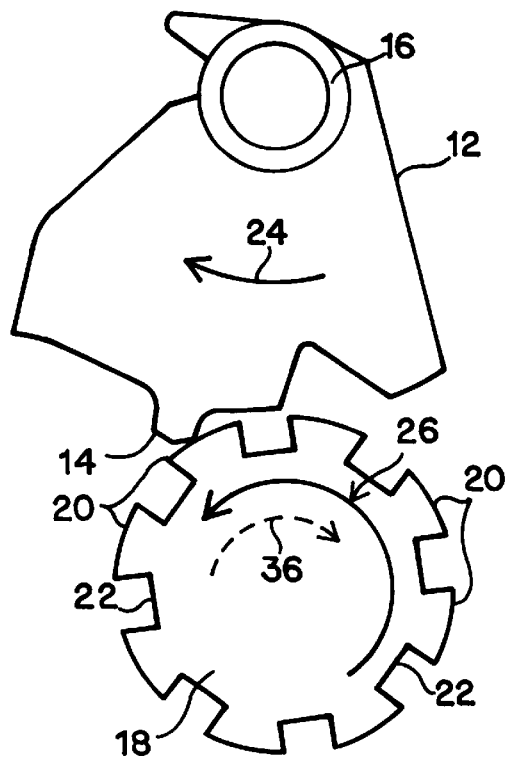
FIG. 1A is a representational front view showing the pawl in its first position relative to the pawl gear.
Figure 1B:
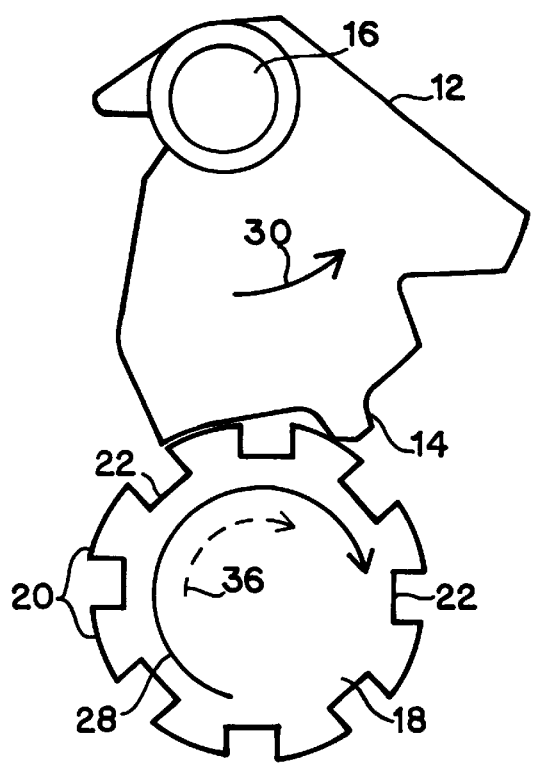
FIG. 1B is a representational front view showing the pawl in its third position relative to the pawl gear.
Figure 1C:
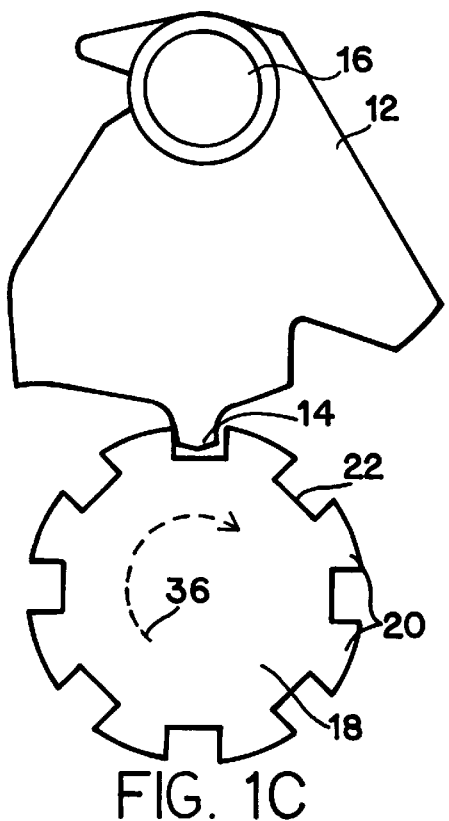
FIG. 1C is a representational front view showing the pawl in its intermediate second position.

FIGS. 1A, 1B, and 1C, conceptually and in simplified format, show the three different configurations of engagement between pawl tooth 14 of pawl assembly 12 and pawl gear 18. In FIG. 1A, pawl assembly 12 is permitted to arcuately rotate in the direction of arrow 24 as pawl gear 18 rotates in the direction of arrow 26 to a position where pawl tooth 14 is clear of the lands 22 between pawl gear teeth 20 and, as long as pawl gear 18 is rotating in the direction of arrow 26, pawl tooth 14 will clank along atop pawl gear teeth 20. The rotation of pawl gear 18 represented by arrow 26 is herein defined as rotation in a first direction, and the position of pawl assembly 12 wherein pawl tooth 14 is not engaged with pawl gear 18 as it rotates in the first direction is defined as the first position. Rotation of pawl gear 18 in the first direction represented by arrow 26 representationally corresponds, for purposes of this specification, with rotation of the drive shaft of a rotationally biased spool in a direction which would permit withdrawal of line, cordage, wire or whatever from a wrapped coil on a spool or shaft and against a torsionally induced rotational force, which is represented by arrow 36.

Opposite rotation, as shown in FIG. 1B representationally, by arrow 28, would permit full retraction of the cord back on to the spring loaded spool. The change in direction from rotation in FIG. 1A, according to arrow 26, to retraction rotation in a second direction in accordance with arrow 28 results in re-engagement of pawl tooth 14 in a land 22 between two pawl gear teeth 20 and causes the arcuate rotation of pawl assembly 12 in the direction of arrow 30 to a point where pawl tooth 14 again rides atop the teeth 20 of pawl gear 18. This is defined for purposes of this specification as rotation in the second direction with pawl assembly 12 riding atop pawl gear 18 in a third position. In this third position, pawl tooth 14 would again clack away upon the tops of pawl sear teeth 20 as long as pawl gear 18 continues to rotate in the direction of arrow 28.

Figure 2:
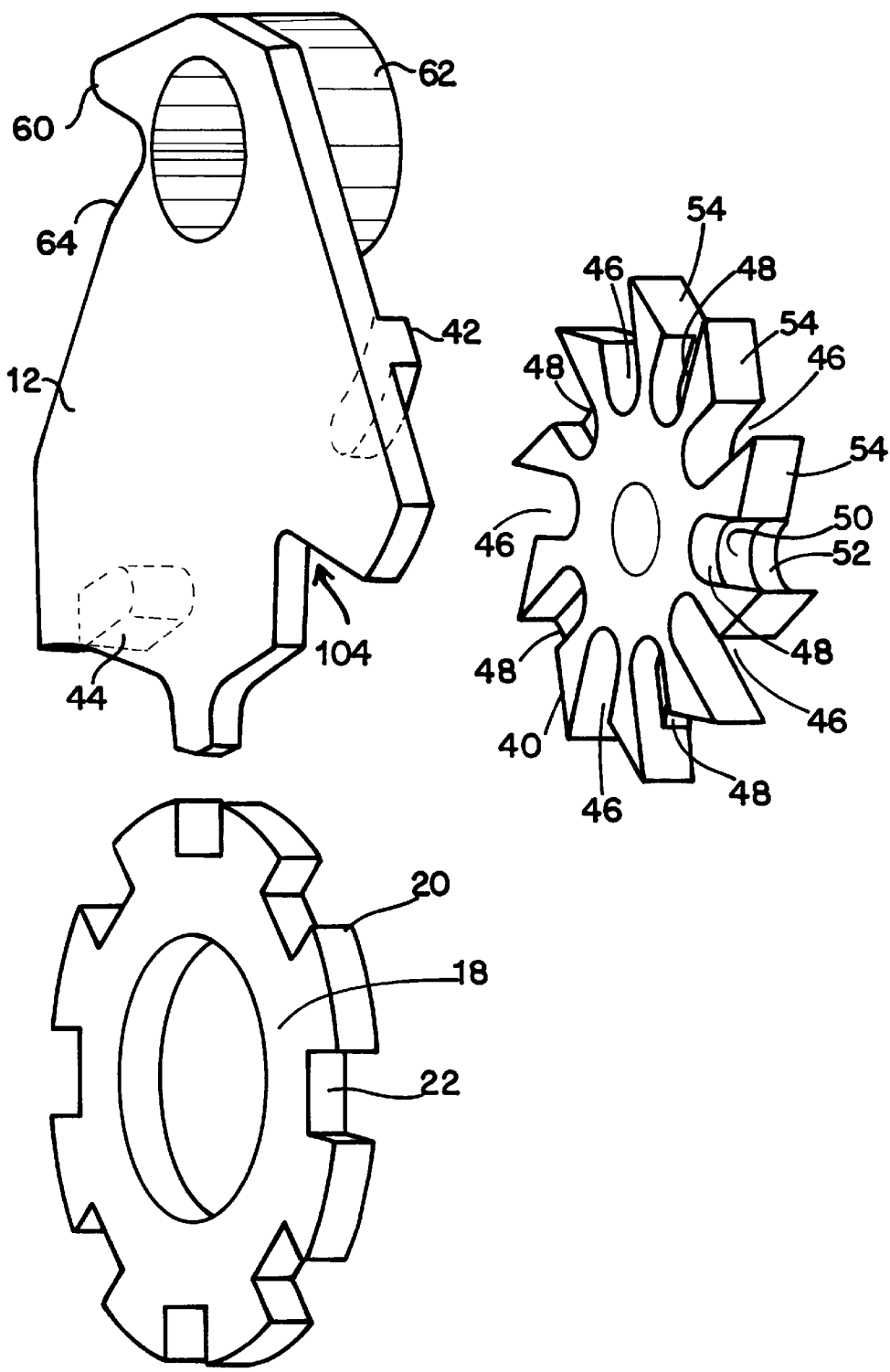
FIG. 2 is a representational perspective view showing the configuration of the pawl assembly, pawl gear, and ratchet gear.

Intermediate between the first position for pawl assembly 12 as shown in FIG. 1A and the third position for pawl 12 as shown in FIG. 1B is the intermediate or second position shown in FIG. 1C. In FIG. 1C there is shown, representationally, a second intermediate position wherein rotation of pawl gear 18 has changed from the direction shown in arrow 26 of FIG. 1A to the direction shown in FIG. 1B by arrow 28, and pawl assembly 12 is thereby arcuately rotated from its first position, as shown in FIG. 1A, in the direction of arrow 30 of FIG. 1B. It is mechanically locked in place in this intermediate, second position, thus mechanically holding pawl tooth 14 in the land 22 between pawl gear teeth 20 of pawl gear 18 as shown in FIG. 1C. This is accomplished by the use of a free-wheeling ratchet gear 40, (shown in FIGS. 2 through 15, but not shown in FIGS. 1A, 1B and 1C) inter-engaging with drive pin 42 and combination drive and lock pin 44 attached to pawl assembly 12, as shown in perspective format in FIG. 2 and in functional format in FIGS. 4A through 13B. Basically speaking, when the pawl assembly 12 rests in the third position as representationally shown in FIG. 1B, and it begins to be rotated in the direction of arrow 26 of FIG. 1A, and engages pawl tooth 14, it will always be arcuately rotated in the direction of arrow 24 back to the first position. During this rotation from the third position back to the first position, drive pin 42, as shown in FIG. 2, will engage ratchet gear 40 and push itself into either a drive slot 46 or a combination drive and locking slot 48 to rotate the ratchet gear one drive slot notch. When rotation of the pawl gear is reversed to the direction shown by arrow 28 in FIG. 1B, and the pawl assembly 12 begins to rotate back from the first position to the third position in the direction of arrow 30 of FIG. 1B, combination drive and locking pin 44 will engage either another drive slot 46, which is deep enough to permit pawl assembly 12 to swing to the third position in the direction of arrow 30 of FIG. 1B, or, it will engage a combination drive and locking slot 48, in which case, because of the depth or height of combination drive and locking pin 44, it will not slide over the top of ledge 50, but instead will engage stop surface 52 of ledge 50. In this configuration, combination drive and locking pin 44 is not able to drive deep enough into the combination drive and locking slot 48 to permit full arcuate rotation of pawl assembly 12 to the third position, but rather locks it in the second intermediate position of FIG. 1C, thus locking pawl gear 18 and its attached line spool.

When pawl gear 18 is again rotated in the direction of arrow 26 of FIG. 1A, pawl assembly 12 will again arcuately rotate in the direction of arrow 24, combination drive and locking pin 44 will disengage from stop surface 52 of combination drive and locking slot 48, drive pin 42 will arcuately swing into engagement with a bearing surface 54 of ratchet gear 40, and eventually slide into a drive slot 46 and thereby rotate ratchet gear 40 to reposition the next drive slot 46 into a position to receive combination drive and locking pin 44 when the rotation of pawl gear 18 is changed to the direction shown in arrow 28 of FIG. 1B, thus permitting pawl assembly 12 to rotate into the third position shown in FIG. 1B, and thus to permit full rotation in the direction of arrow 28. All of this is sequentially described in FIGS. 4A through 13B.

Figure 3:
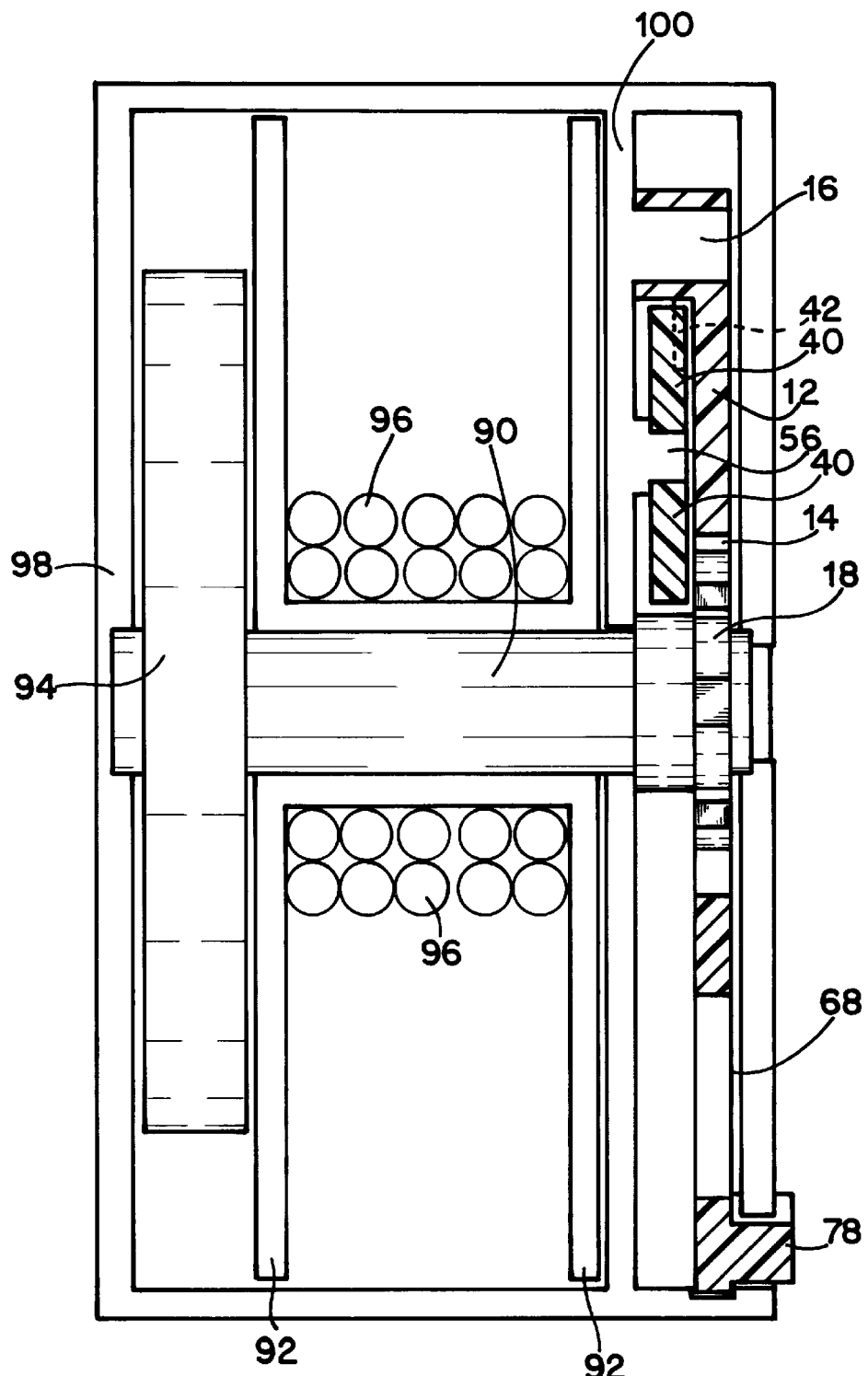
FIG. 3 is a representational sectional side view of the mechanically driven ratchet assembly configured for use with a spring loaded spool of cord.

To place the sequence of events in context, there is shown in FIG. 3 a representation of a typical spring-loaded spool assembly in which the mechanically driven ratchet assembly 10 may be used. It should be distinctly pointed out that while this Best Mode section describes a preferred embodiment in the context of a spring-loaded spool of cord, the ratchet assembly itself is suitable for a wide variety of uses with any type of rotationally biased shaft. For example, the mechanically driven ratchet assembly is suitable for use with a window blind shaft which is not rotationally biased by means of a spring, but rather by means of gravity induced by weight of the window blind hanging from the shaft. It could be used in conjunction with a spool of telephone line for either telephone or a computer modem, or any other application with any other type of shaft which is rotationally biased to rotate in one direction.

As shown in FIG. 3, there is a spool shaft 90 extending out from a spring cup 94 which contains a spring which will induce a rotational bias to spool shaft 90, as shown representationally as arrow 36 in FIGS. 1A, 1B and 1C. The exact configuration of the spring cup plays no part in the present invention. All that is required is that somehow rotational bias must be induced to spool shaft 90. Spring cup 94 is attached to outer housing 98. A pair of opposing spool sides 92 are provided, and serve to hold on shaft 90 a spool of line cord 96. An intermediate support frame 100 is provided and attached to outer housing 98 and serves to support pawl assembly shaft 16 and ratchet gear shaft 56. Ratchet gear 40 is freely rotatable about ratchet gear shaft 56, and pawl assembly 12 is freely rotatable through a defined arc about pawl assembly shaft 16. Attached to spool shaft 90 is pawl gear 18. Spring and locking assembly 68 is also contained within outer housing 98 and rotatable through a defined arc to engage one of the other sides of pawl assembly 12. It is manually operable by means of knob 78 extending through an opening in outer housing 98. Knob 78 is attached to locking assembly handle 76, which itself is attached to spring and locking assembly 68.

Figure 4A:
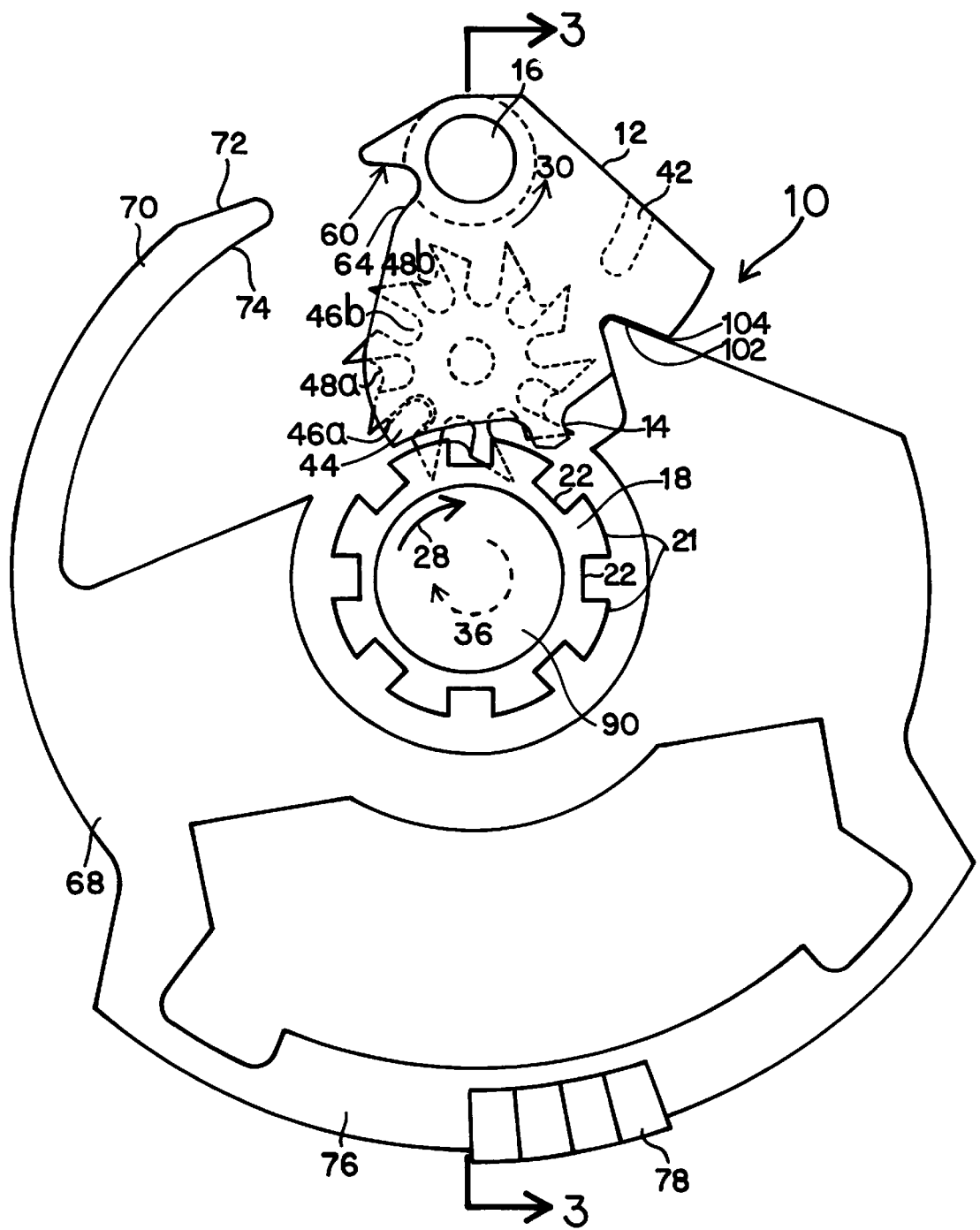
FIG. 4A is a front plan view of the ratchet assembly in a locked out position.
Figure 4B:
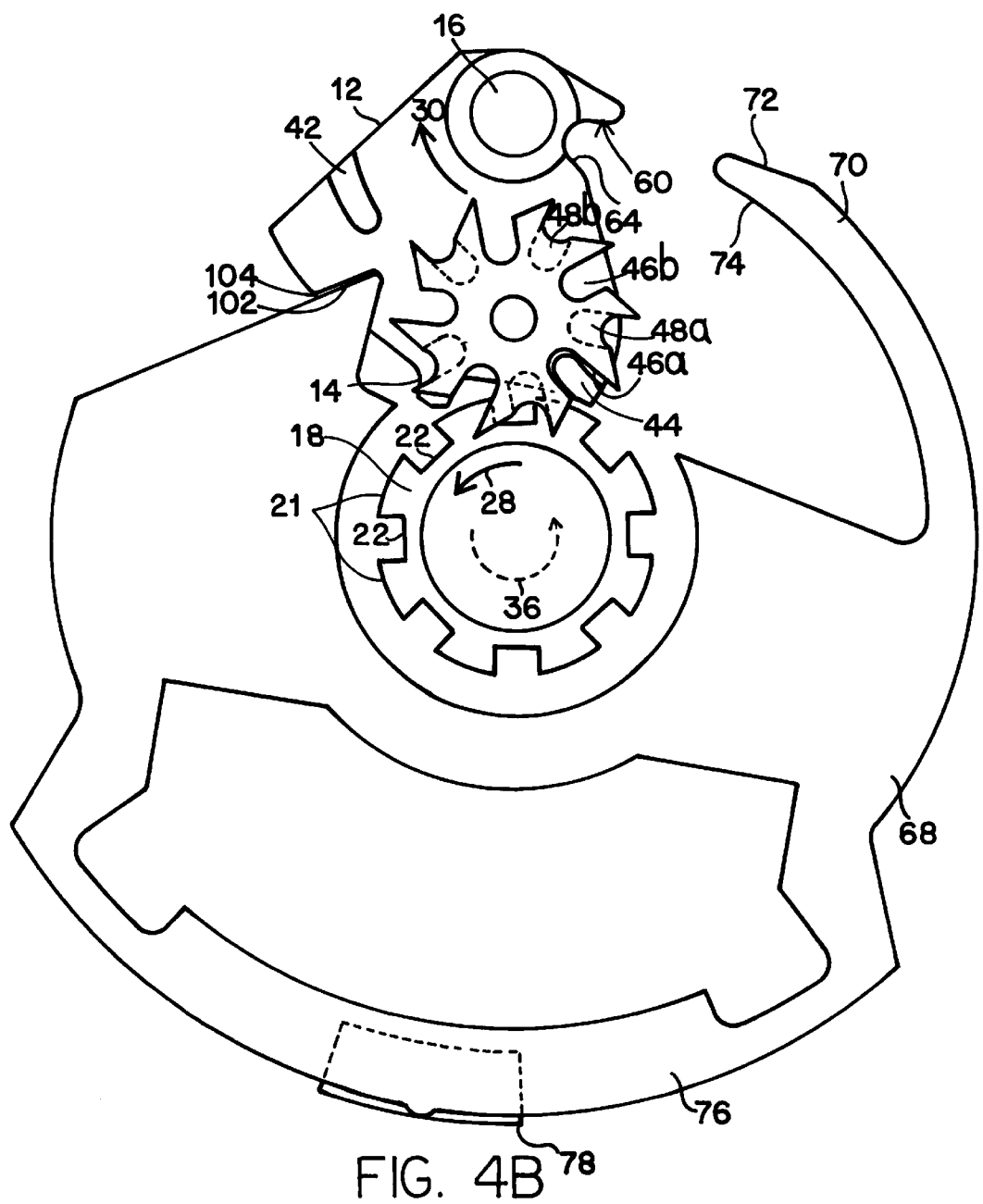
FIG. 4B is a back plan view of the ratchet assembly in a locked out position.
Figure 5A:
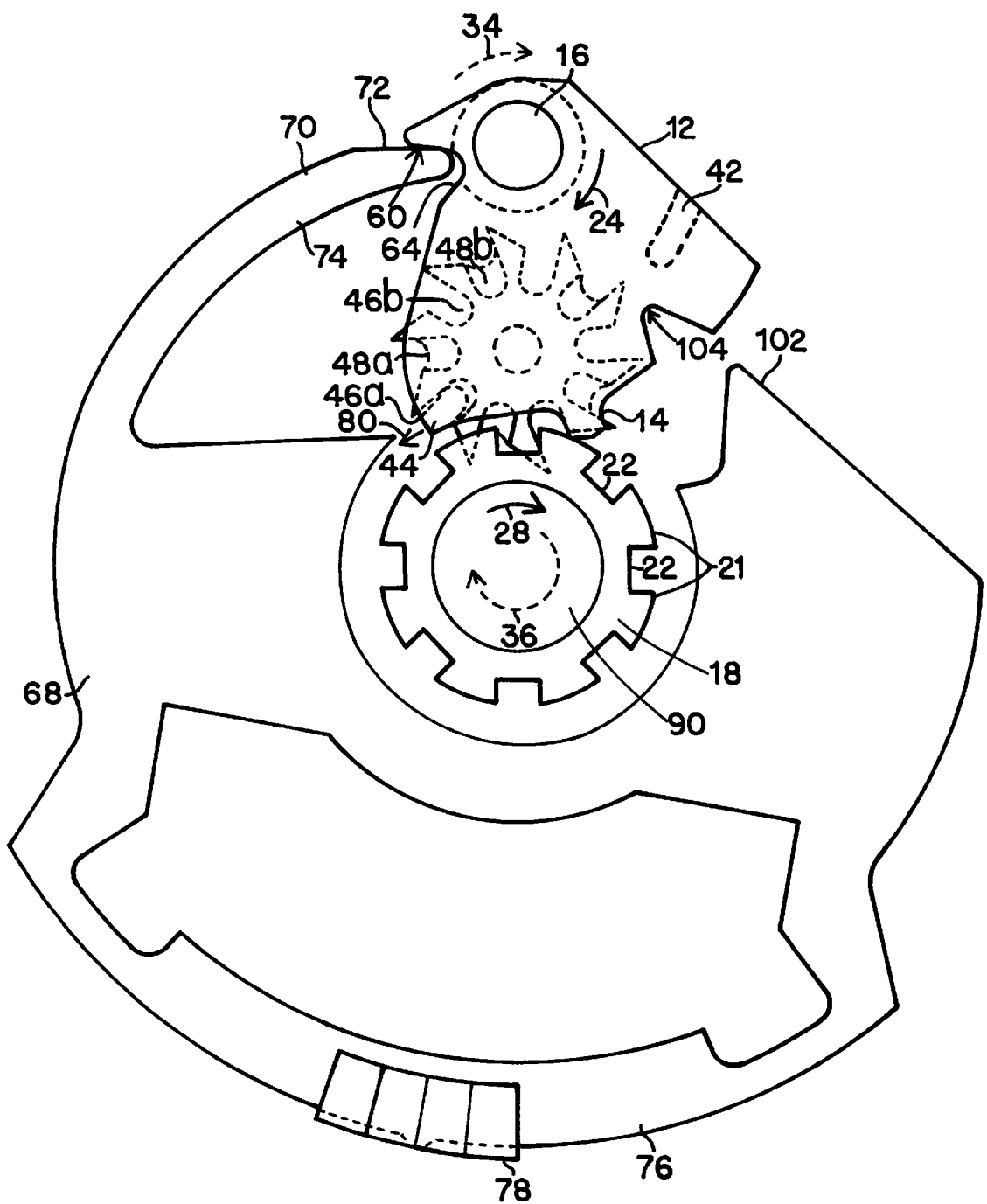
FIG. 5A is a front plan view of the ratchet assembly in a configuration permitting retraction or rewinding of cordage onto a spool.
Figure 5B:
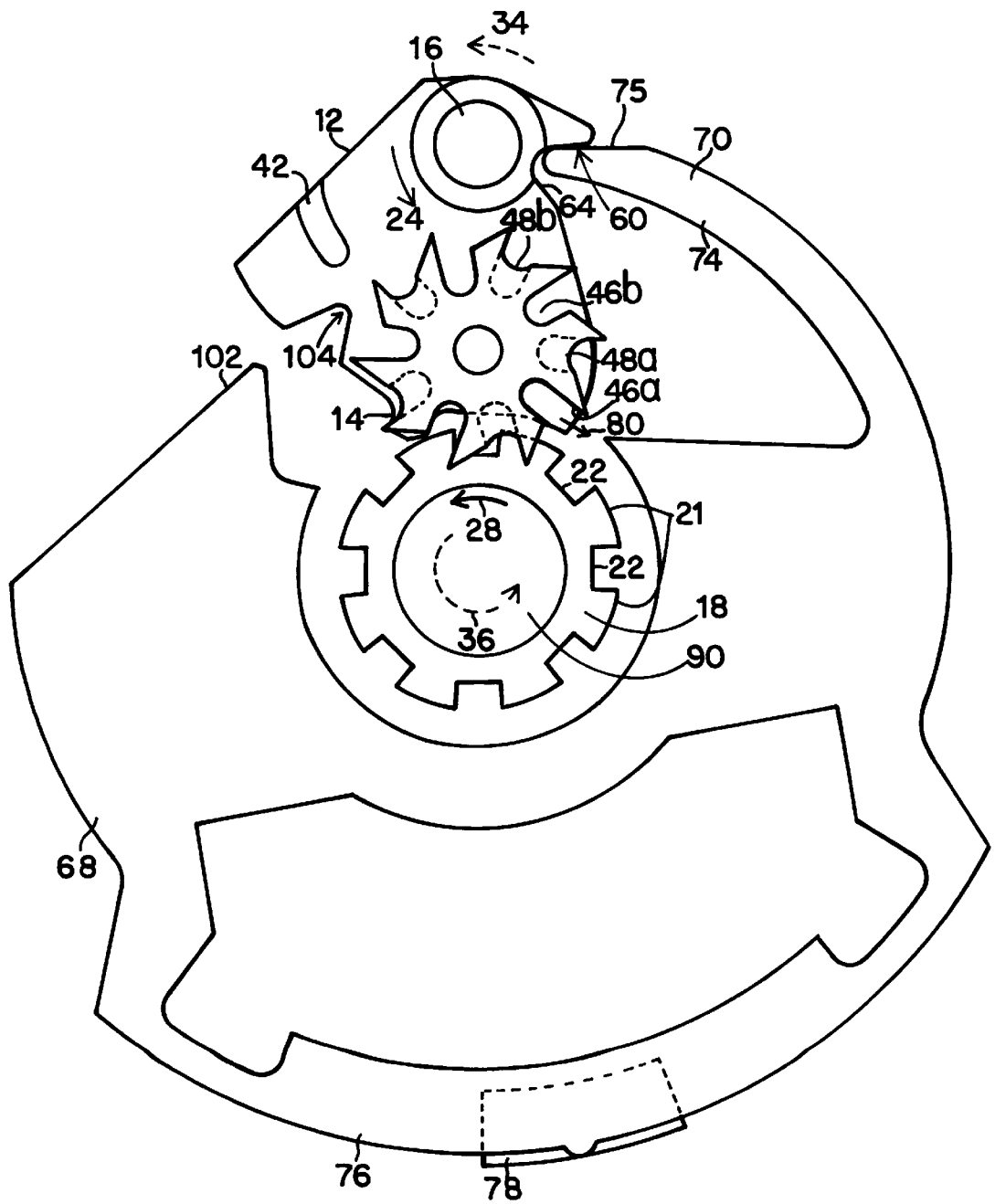
FIG. 5B is a back plan view of the ratchet assembly in a configuration permitting retraction or rewinding of cordage on to a spool.

With general reference to FIG. 2 for part configuration, there is shown in FIGS. 4A and 4B, mechanically driven ratchet assembly 10 in a locked out configuration. In this configuration, pawl assembly 12 has been pushed in the arcuate direction shown by arrow 30, by means of locking tab 102 engaging against surface 104 of pawl 12 to a position where pawl tooth 14 will not engage teeth 20 of pawl gear 18, thus permitting free rotation of shaft 90, either in the direction of arrow 28 in the direction of torsional force arrow 36, or in the direction opposite of torsional force arrow 36 to withdraw cord. In effect, without engagement of pawl tooth 14 with the teeth 20 of pawl gear 18, the ratchet is locked out and the operator is free to rotate the spool shaft 90 in either direction, either to withdraw cord 96 from the spool, or to allow it to be retracted onto the spool by means of the torsional force generated by spring cup 94. In FIGS. 5A and 5B, the mechanically driven ratchet assembly 10 has been unlocked by rotation of spring and locking assembly 68 to withdraw from engagement locking tab 102. Simultaneously with the withdrawal of locking tab 102, upper surface 72 of torsion spring bar 70 which extends out from spring and locking assembly 68, engages upper spring surface 60 of pawl assembly 12, thus inducing a torsional rotational force on pawl assembly 12, as shown by arrow 34. This aids in the rotation of pawl assembly 12 in the direction of arrow 24 until pawl tooth 14 engages either teeth 20 or lands 22 of pawl gear 18.

As pawl assembly 12 is driven arcuately down in the direction of arrow 34 by upper surface 72 of torsion spring bar 70, combination drive and locking pin 44 begins to be withdrawn from drive slot 46A in the direction of arrow 80. Simultaneously, drive pin 42 begins to travel toward ratchet gear 40, also in the direction of arrow 80 until pawl tooth 14 engages some surface on pawl gear 18. In this configuration, the pawl assembly 12 is in what is defined as its third position, which is a position in which it will be during permitted retraction of line cord 96 on to spool shaft 90 in the direction of arrow 28 which will typically be induced by a torsional force as shown by arrow 36. It is also the configuration in which it will remain after the line cord has been fully retracted and will remain so unless and until pawl 12 has been locked out of engagement with pawl gear 18, as shown in FIGS. 4A and 4B. In this configuration, mechanically driven ratchet assembly 10 is ready for a transition of pawl 12 from its third position to its first position at any time that spool shaft 90 is rotated in the direction of arrow 26 of FIG. 1A.

The torsional force represented by arrow 34 induced by upper surface 72 of torsion spring bar 70 as shown in FIG. 5A thus insures positive engagement of pawl tooth 14 with pawl gear 18 when the change in direction occurs from a retraction direction of arrow 28 to the withdrawal direction of arrow 26, as shown in FIGS. 1A and 1B. Without engagement of torsion spring bar 70, this positive engagement may not always occur, particularly if the ratchet assembly is made out of small, lightweight material, and perhaps is held upside down where gravity would work against reengagement of pawl tooth 14. However, it should be distinctly noted that the spring induced torsional forces represented by arrow 34 is not essential to the operation of the present invention and all of its embodiments. For example, in some configurations, the ratchet assembly and the pawl assembly could be fabricated of heavy material such as steel, having sufficient mass, and anchored in such a way that gravity alone will assure positive reengagement of pawl tooth 14 with ratchet gear 18 upon being unlocked or upon the occurrence of a change in direction of the rotation of pawl gear 18.

Figure 6A:
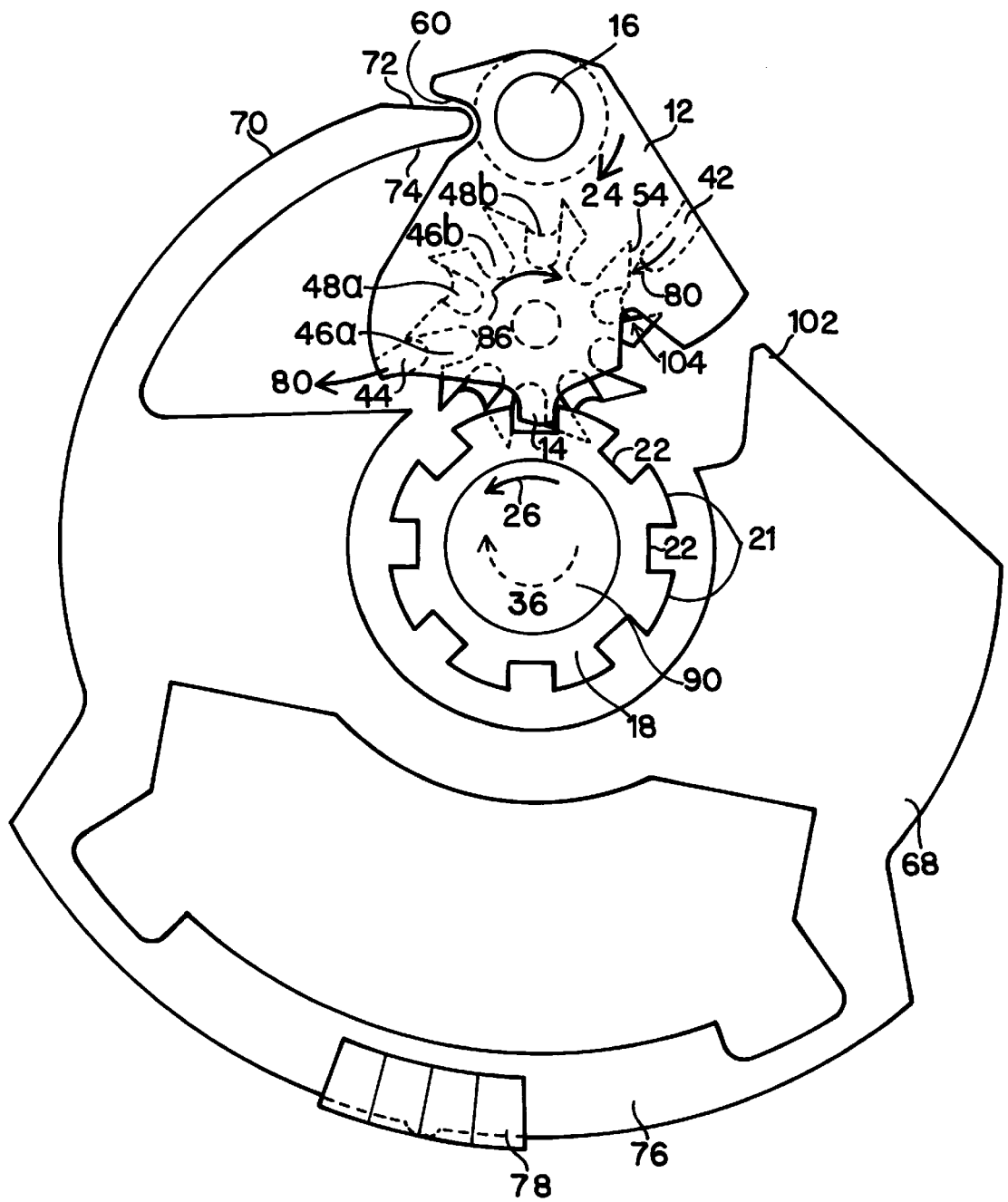
FIG. 6A is a front plan view of the ratchet assembly in a transition from the configuration permitting retraction to a configuration permitting withdrawal of cordage from a line spool.
Figure 6B:
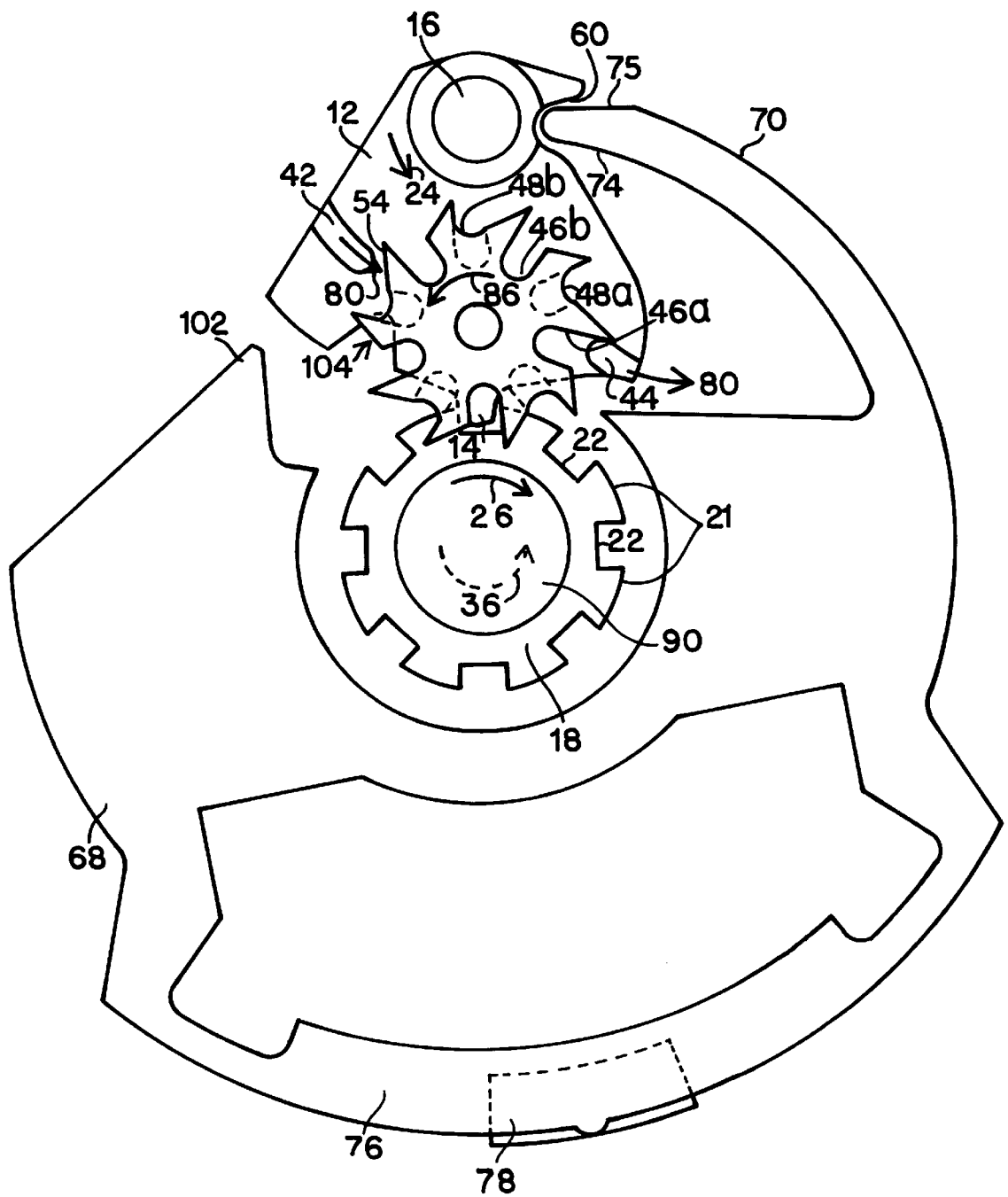
FIG. 6B is a back plan view of the ratchet assembly in a transition from the configuration permitting retraction to a configuration permitting withdrawal of cordage from a line spool.

In FIGS. 6A and 6B, mechanically driven ratchet assembly 10 is transitioning from the configuration shown in FIG. 5A, wherein pawl assembly 12 is in the third position, as shown in FIG. 1B, to a configuration where pawl assembly 12 will be in the first position, as shown in FIG. 1A. This is accomplished by causing the rotation of spool shaft 90 in the direction of arrow 26. As pawl gear 18 rotates with spool shaft 90, it engages pawl tooth 14, and thus arcuately rotates pawl assembly 12 in the direction of arrow 24.

As this rotation of pawl assembly 12 occurs in the direction of arrow 24, combination drive and locking pin 44 fully withdraws from drive slot 46A. Because of the difference in radiuses between ratchet gear 40 and pawl assembly 12, in practice, combination drive and locking pin 44 engages the side surface of drive slot 46A and actually rotates ratchet gear 40 a little bit in the direction shown by arrow 86. As this occurs, it repositions a ratchet gear drive surface 54 for contact with drive pin 42, as arcuate rotation of pawl assembly 12 continues.

Figure 7A:
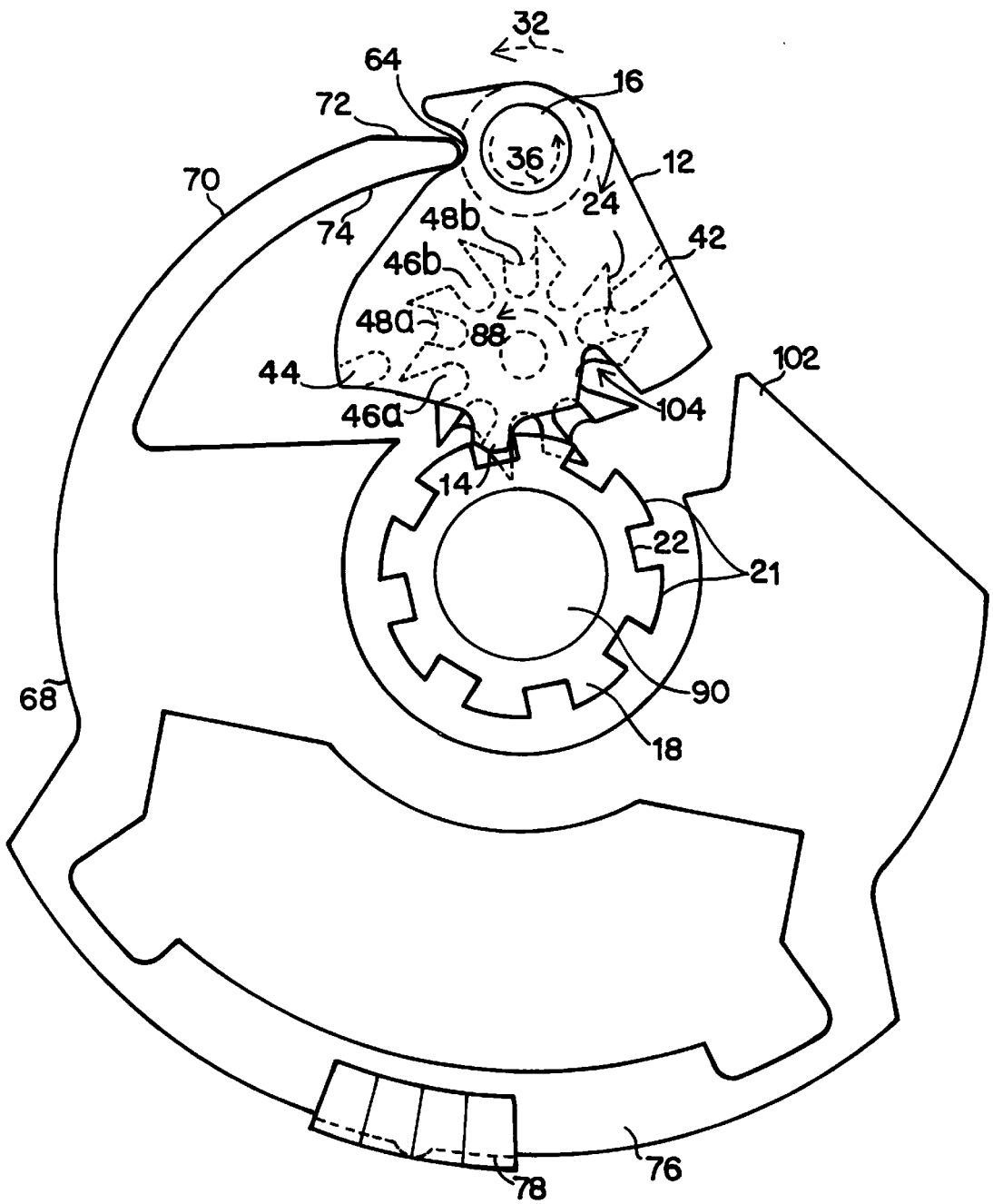
FIG. 7A is a front plan view of the ratchet assembly in a configuration wherein it is transitioning from a retraction position to a withdrawal position and the ratchet gear is being rotated.
Figure 7B:
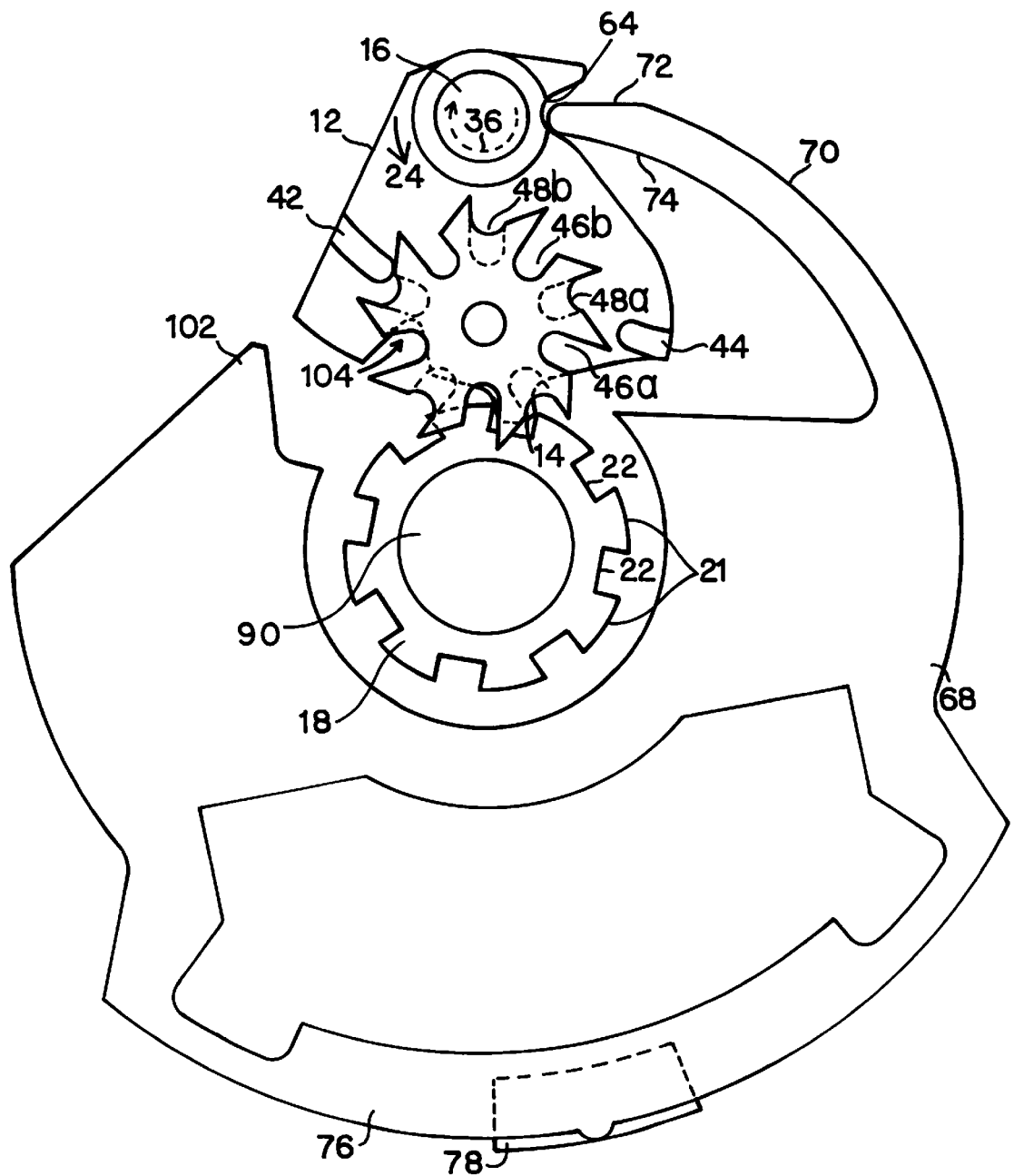
FIG. 7B is a back plan view of the ratchet assembly in a configuration wherein it is transitioning from a retraction position to a withdrawal position and the ratchet gear is being rotated.

In FIGS. 7A and 7B, the transition from the third position to the first position continues and as it does, drive pin 42 engages ratchet gear drive surface 54, thus inducing rotation in ratchet gear 40 in the direction of arrow 88. At that time, combination drive and locking pin 44 is now fully disengaged from ratchet gear 40.

Also, as shown in FIGS. 7A and 7B, as the transition from the third position to the first position continues, lower surface 74 of torsion spring bar 70 comes into contact with lower spring surface 64 of pawl assembly 12 and begins to induce a rotational force in the direction of arrow 32. This torsional force induced by lower surface 74 of torsion spring bar 70 is intended to aid in arcuately rotating pawl assembly 12 in the direction of arrow 30 as shown in FIG. 1B when a change in direction next occurs.

Figure 8A:
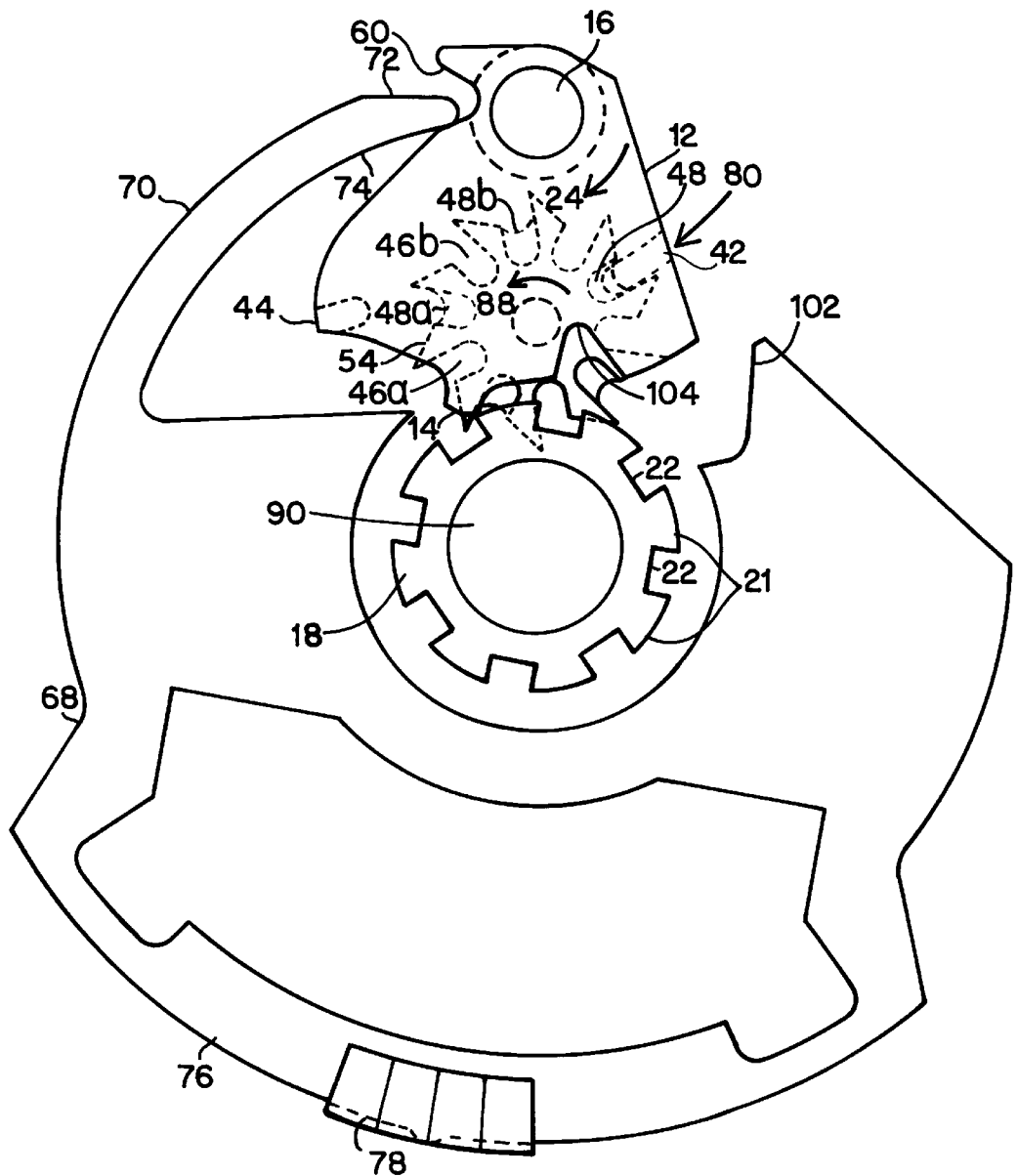
FIG. 8A is a front plan view of the ratchet assembly in a configuration permitting withdrawal of cord from a line spool.
Figure 8B:
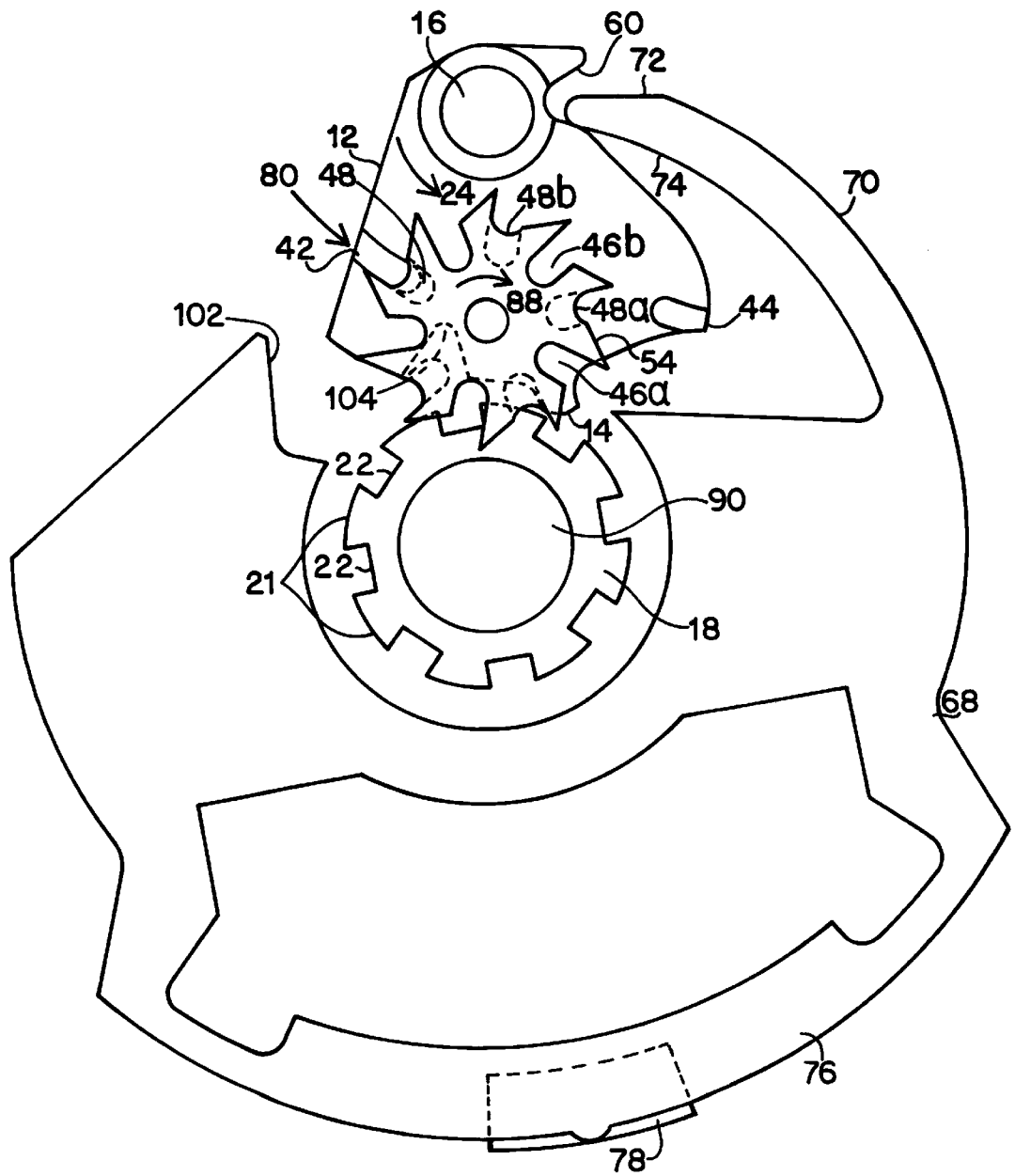
FIG. 8B is a back plan view of the ratchet assembly in a configuration permitting withdrawal of cord from a line spool.
Figure 9A:
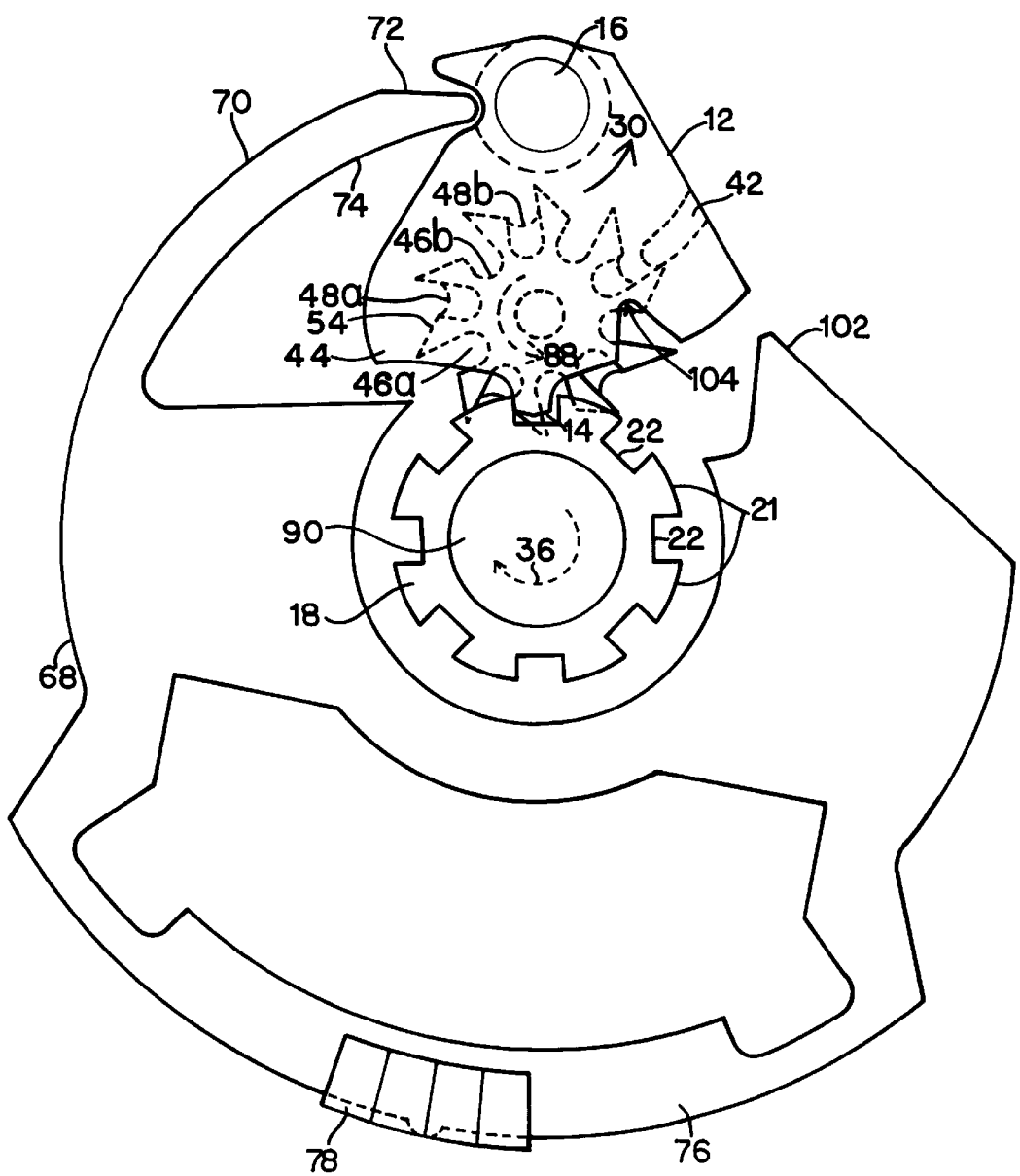
FIG. 9A is a front plan view of the ratchet assembly in a configuration wherein it is transitioning from a configuration permitting withdrawal of cord from a line spool to a locked position.
Figure 9B:
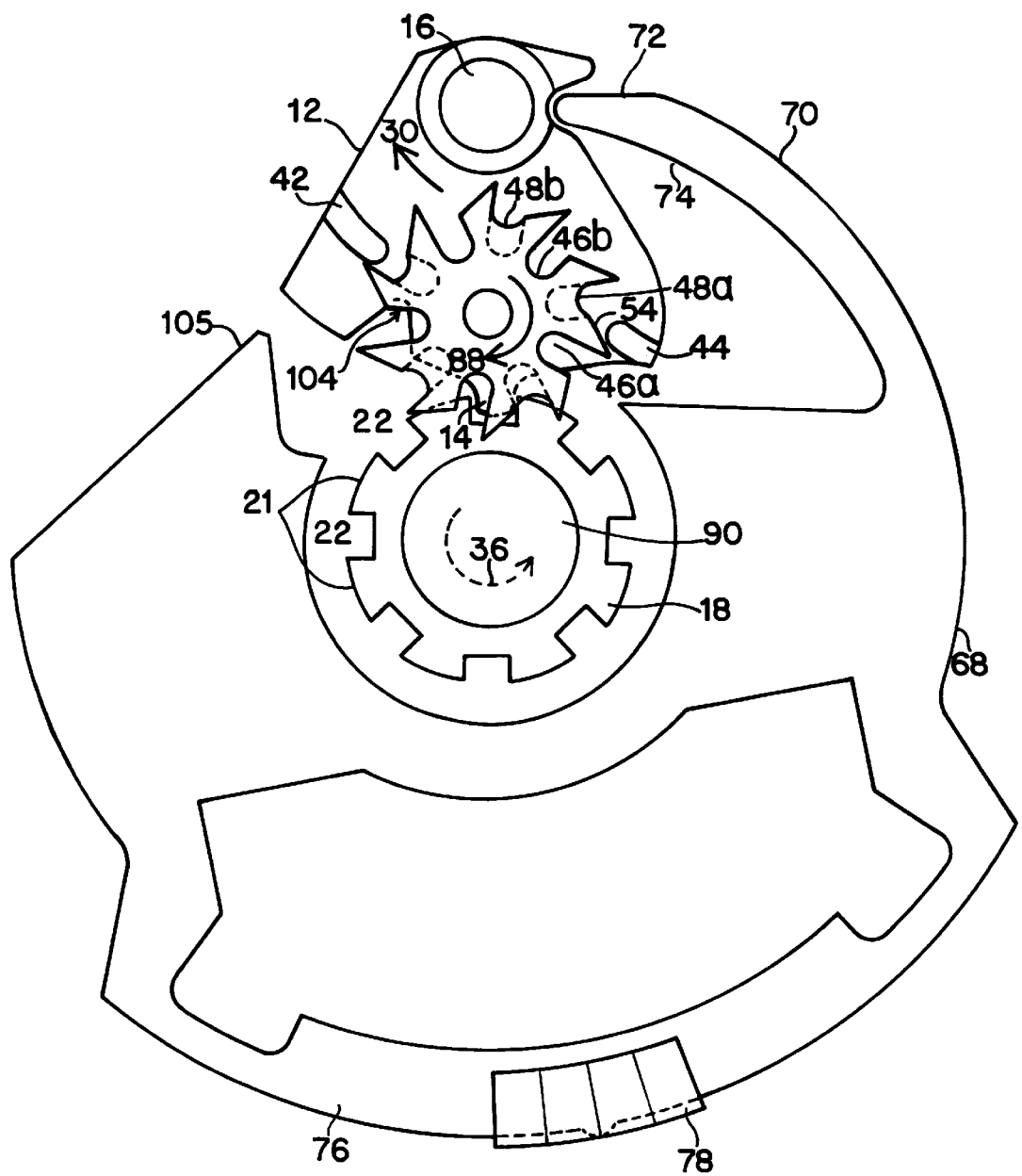
FIG. 9B is a back plan view of the ratchet assembly in a configuration wherein it is transitioning from a configuration permitting withdrawal of cord from a line spool to a locked position.
Figure 10A:
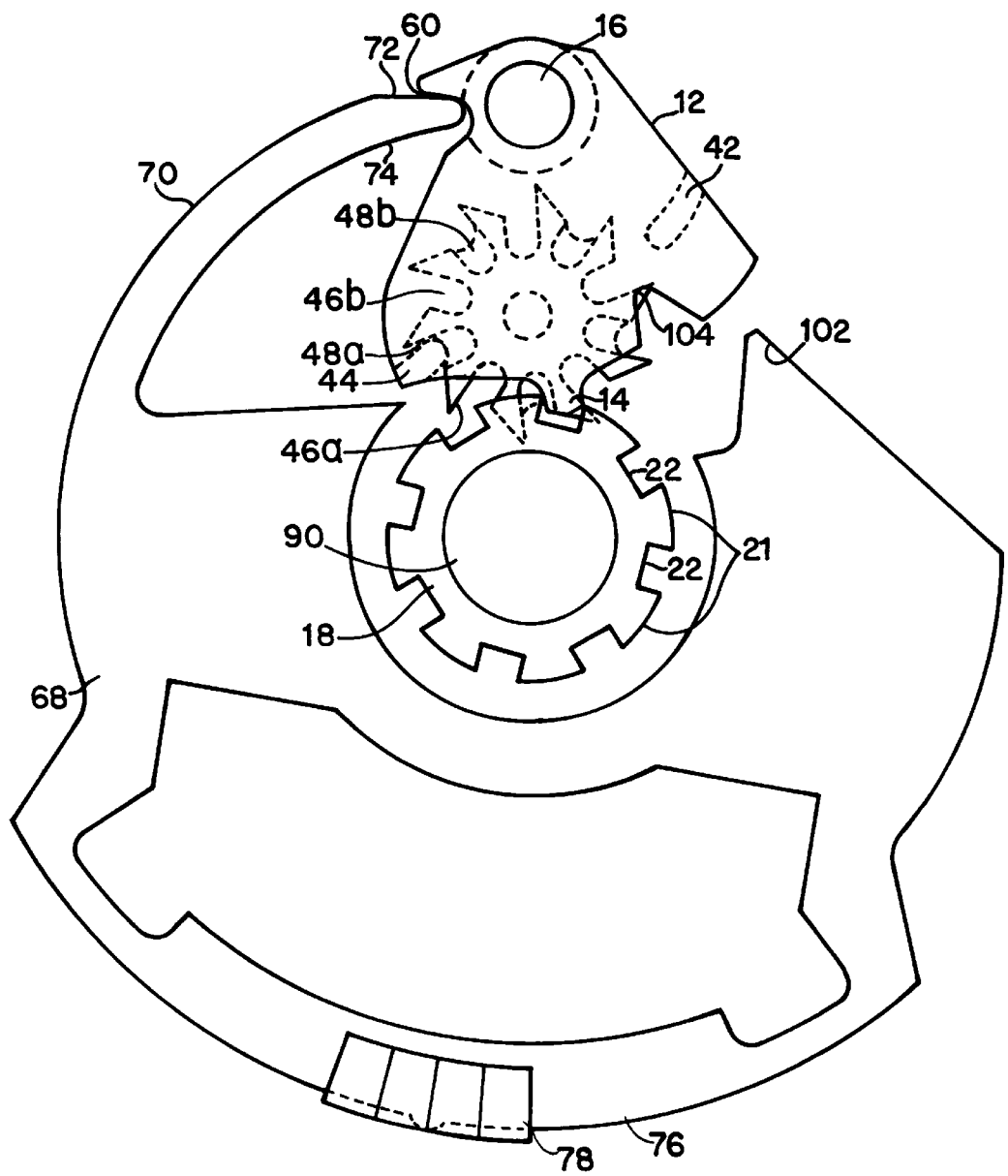
FIG. 10A is a front plan view of the ratchet assembly in a configuration wherein the ratchet assembly is locked to preclude further rotation of the line spool to a retracted position.
Figure 10B:
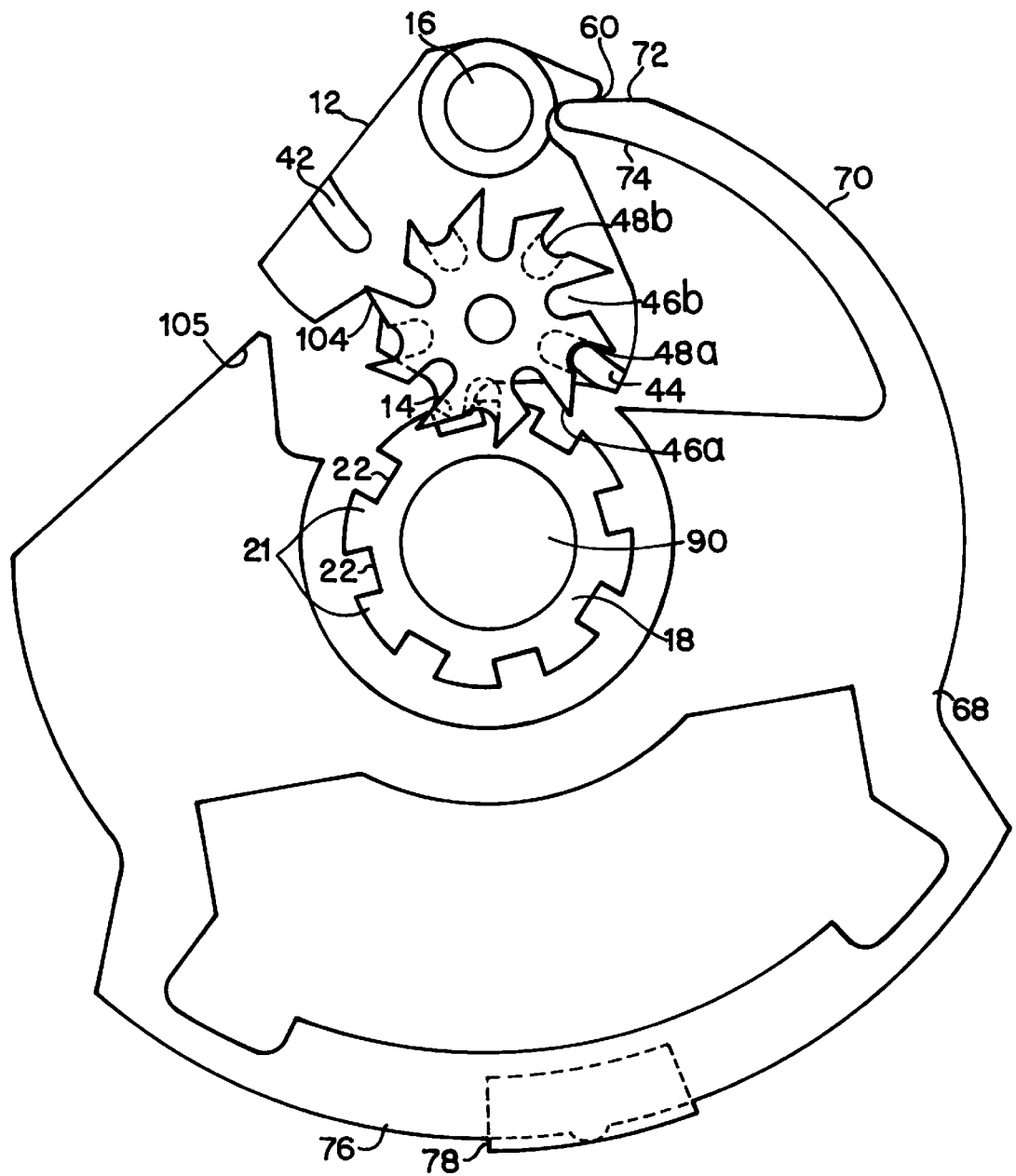
FIG. 10B is a back plan view of the ratchet assembly in a configuration wherein the ratchet assembly is locked to preclude further rotation of the line spool to a retracted position.

In FIGS. 8A and 8B, the mechanically driven ratchet assembly has made the transition from a configuration where the pawl assembly 12 was in the third position to a configuration where pawl assembly 12 is in the first position. During this transition, drive pin 42 has now engaged within a combination drive and locking slot and in doing so has rotated ratchet gear 40 in the direction of arrow 88 to a position such that when pawl assembly 12 again changes its direction of rotation back to that shown by arrow 30 of FIG. 1B, combination drive and locking pin 44 will engage ratchet gear drive surface 54 and eventually slide into and lock into combination drive and locking slot 48A. Because drive pin 42 is configured to interfit into both drive slots 46 and combination drive and locking slots 48, transition from the third position back to the first position always occurs. However, that is not the case with the transition with arcuate pendulum motion back from the first position back towards the third position. As shown in FIGS. 8A through 10B, beginning with FIGS. 8A and 8B, the rotation of ratchet gear 40 in the direction of arrow 88 induced by drive pin 42 engaging combination drive and locking slot 48, has repositioned ratchet gear 40, so that when the transition begins from the first position back towards the third position as shown by arrow 30 in FIGS. 9A and 9B, combination drive and locking pin 44 will engage ratchet gear drive surface 54 and thereby continue to rotate ratchet gear 40 in the direction of arrow 88 until, as shown in FIGS. 10A and 10B, combination drive and locking pin 44 bumps into stop surface 52 of combination drive and locking slot 48A, as shown in FIGS. 10A and 10B. Once it does, pawl assembly 12 is prevented from any further arcuate rotation in the direction of arrow 30, as shown in FIG. 9, and in effect it is locked in place with pawl tooth 14 engaged in land 22 between pawl teeth 20 of pawl gear 18. This prevents further retraction of cord 96 on to spool shaft 90. Hence the cord is locked in an extended position with pawl assembly 12 held in an intermediate second position.

To release pawl assembly 12 from the second position, ratchet gear 40 must be somehow rotated further in the direction of arrow 88 to reposition it in relationship to combination drive and locking pin 44, such that combination drive and locking pin 44 will re-engage ratchet wheel 40 at a position where it can be fully inserted into a drive slot 46, as opposed to a combination drive and locking slot 48. How this is done is shown in FIGS. 11A through 13B.

Figure 11A:
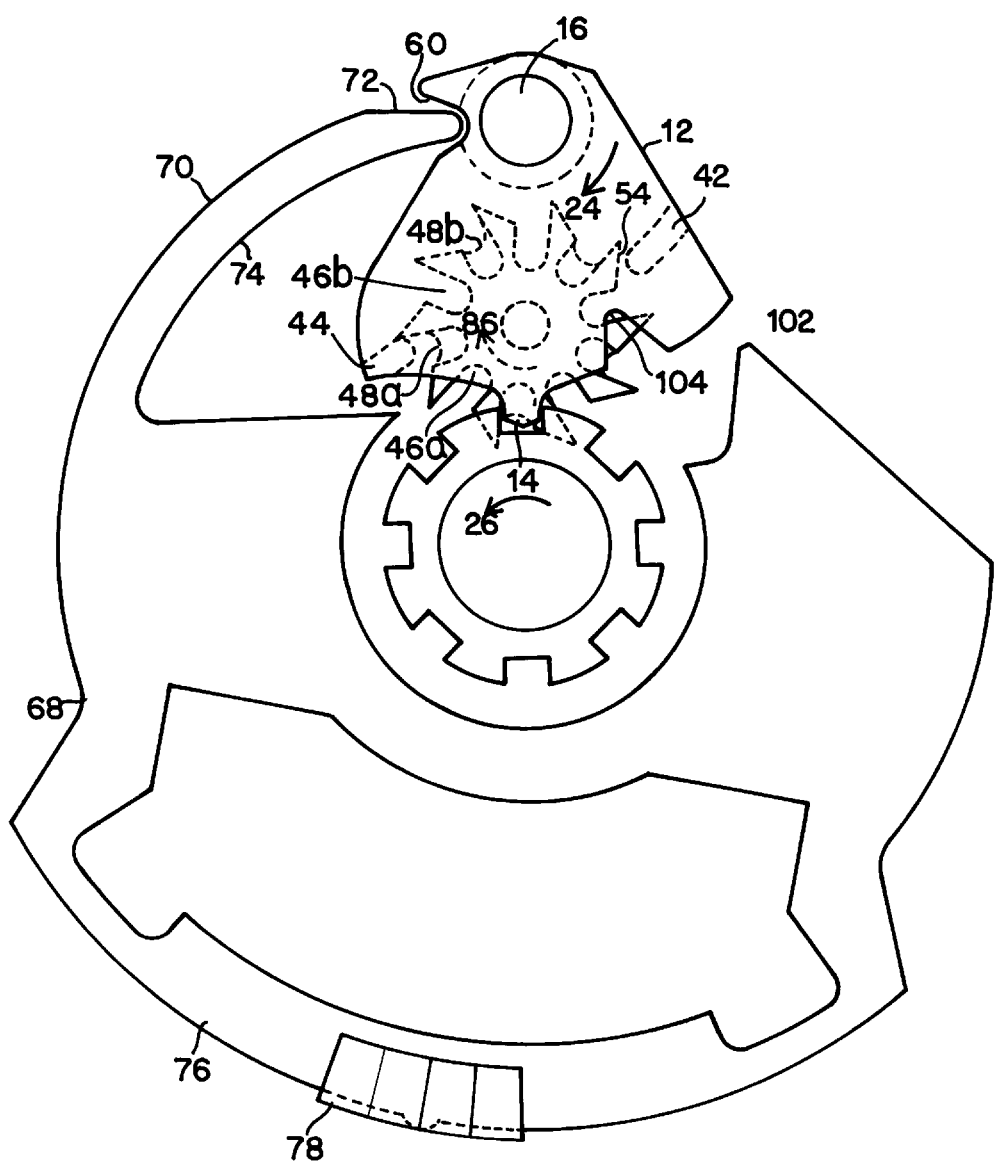
FIG. 11A is a front plan view of the ratchet assembly in a configuration wherein the ratchet assembly is transitioning from the locked position back toward the withdrawal permitted configuration.
Figure 11B:
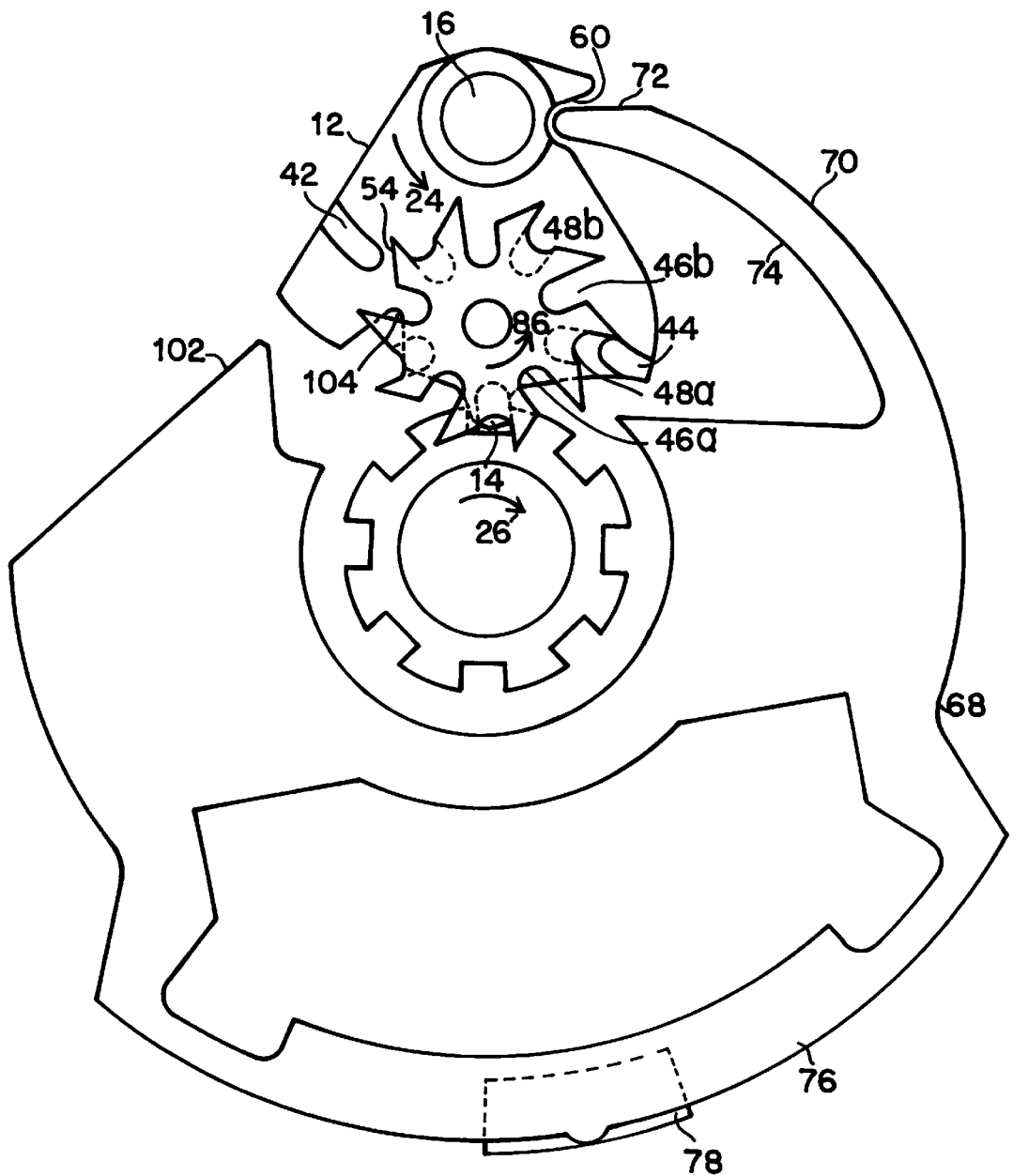
FIG. 11B is a back plan view of the ratchet assembly in a configuration wherein the ratchet assembly is transitioning from the locked position back toward the withdrawal permitted configuration.

In FIG. 11A, pawl assembly 12 is being arcuately rotated in the direction of arrow 24 by means of spool shaft 90 being rotated in the direction of arrow 26, thus driving pawl tooth 14 and pawl assembly 12 back from the second intermediate position towards the first position. This is typically accomplished by pulling out line cord from the spool to rotate it. As this occurs, combination drive and locking pin 44 is withdrawn from combination drive and locking slot 48A, thus rotating ratchet gear 40 in the direction of arrow 86 to position an engagement surface 54 for engagement with drive pin 42.

Figure 12A:
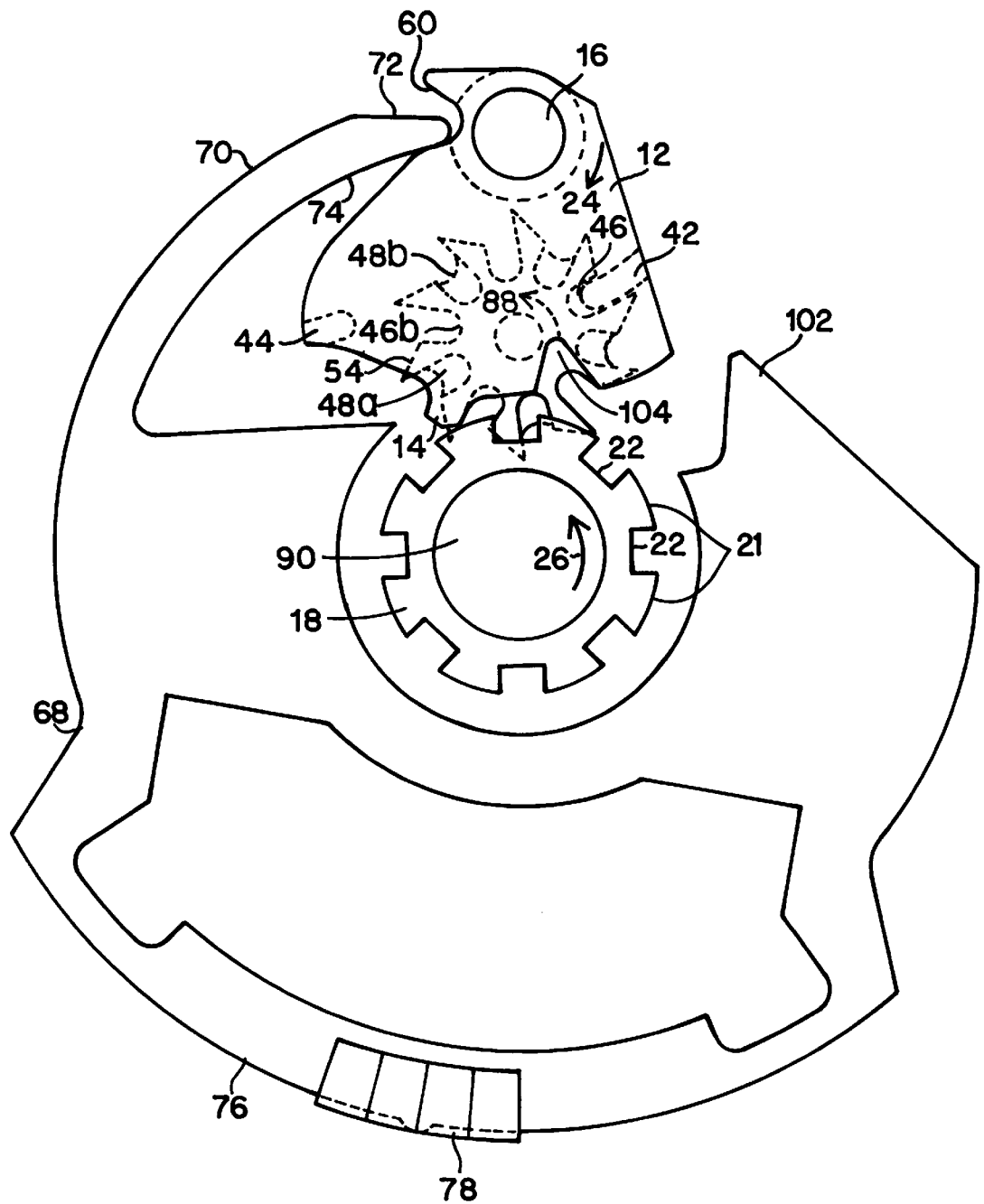
FIG. 12A is a front plan view of the ratchet assembly in a configuration wherein it is transitioning from the locked position to the configuration permitting withdrawal of line and the ratchet gear is rotated one additional notch.
Figure 12B:
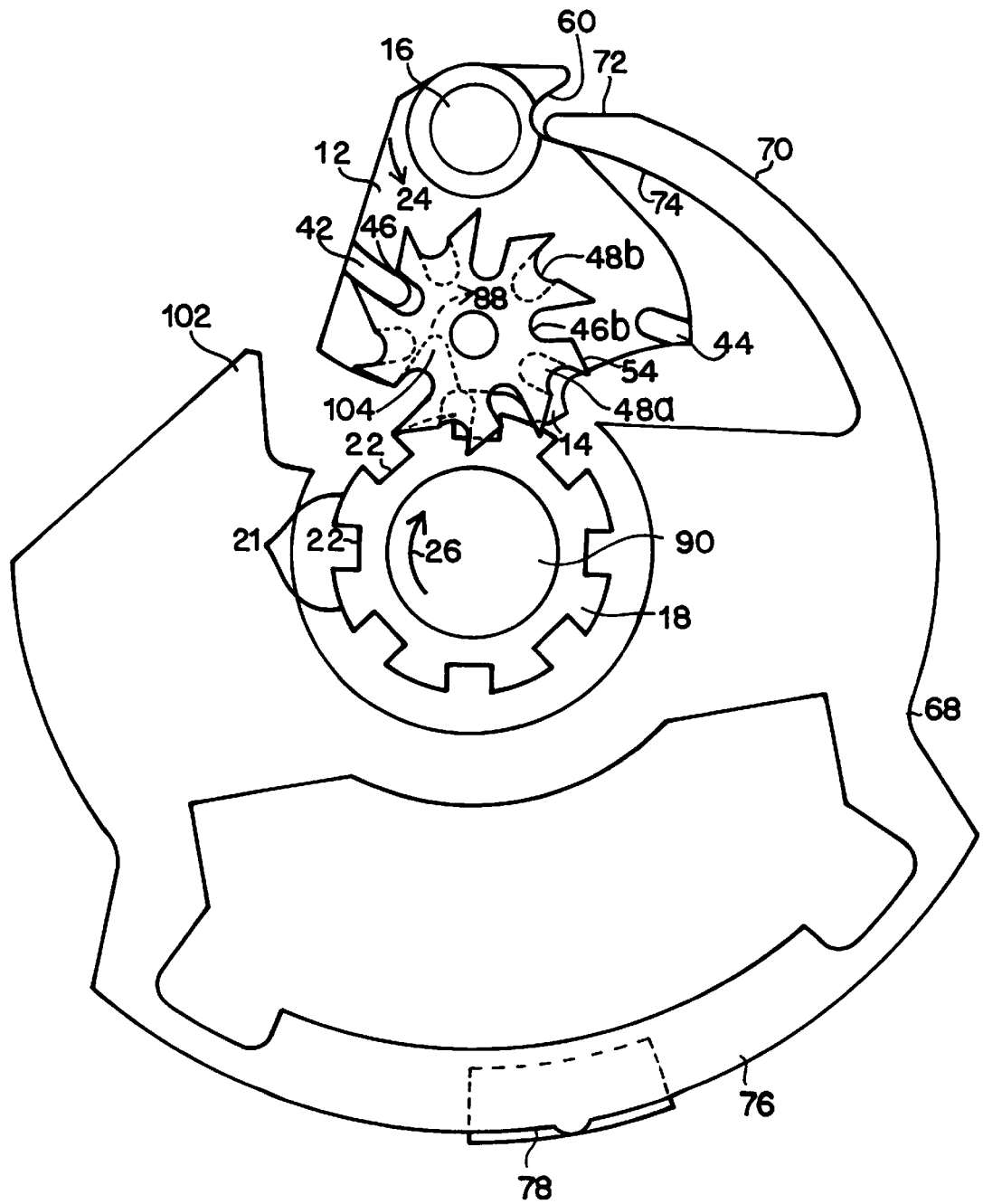
FIG. 12B is a back plan view of the ratchet assembly in a configuration wherein it is transitioning from the locked position to the configuration permitting withdrawal of line and the ratchet gear is rotated one additional notch.

As shown in FIGS. 12A and 12B, as pawl assembly 12 continues to arcuately rotate in the direction of arrow 24, drive pin 42 again engages a slot, in this case a drive slot 46, thus rotating ratchet gear 40 in the direction of arrow 88 to reposition a drive surface 54 and drive slot 46B for future contact with combination drive and locking pin 44.

Figure 13A:
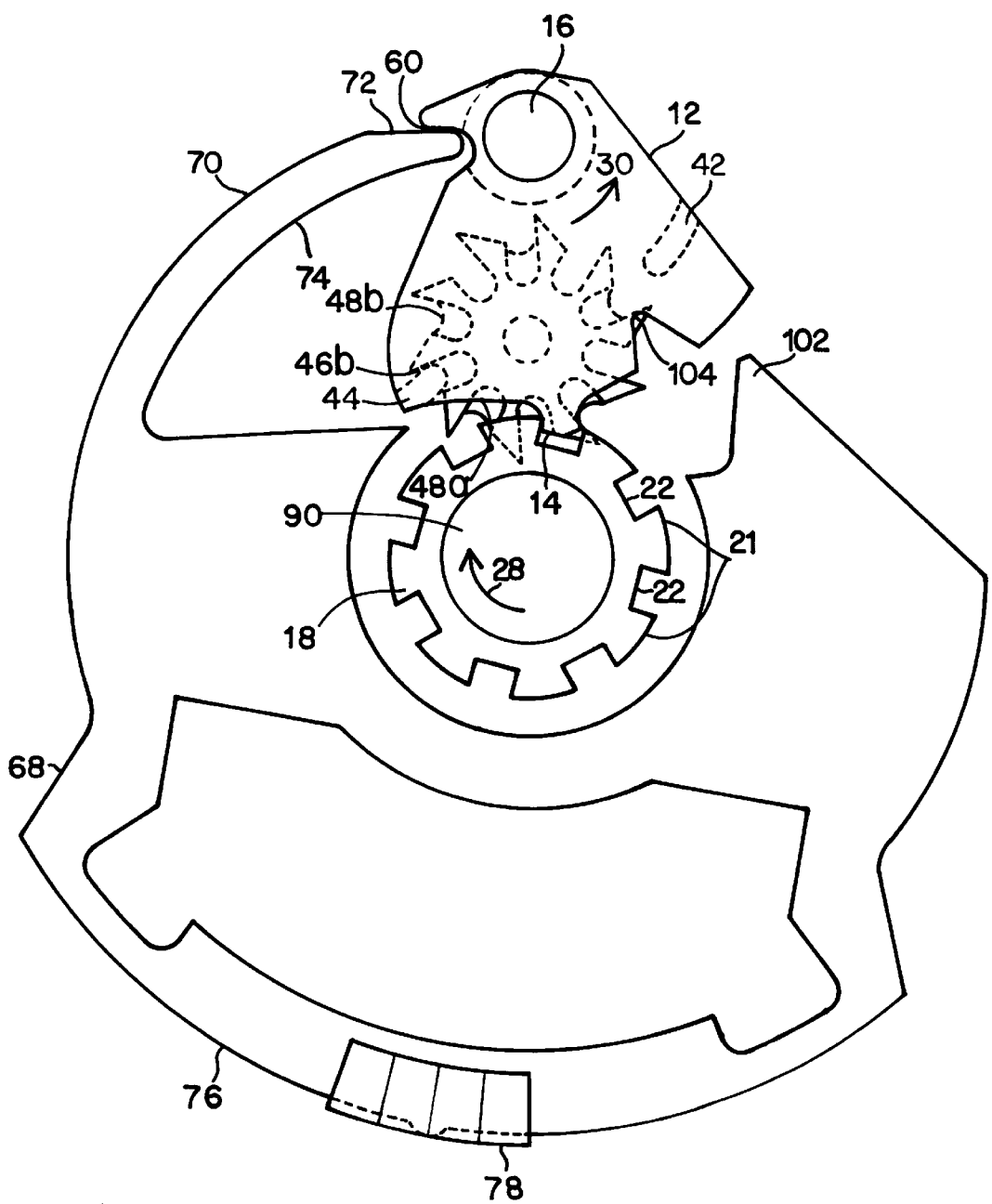
FIG. 13A is a front plan view of the ratchet assembly in a configuration wherein it is transitioning to a configuration wherein retraction of line cord is permitted.
Figure 13B:
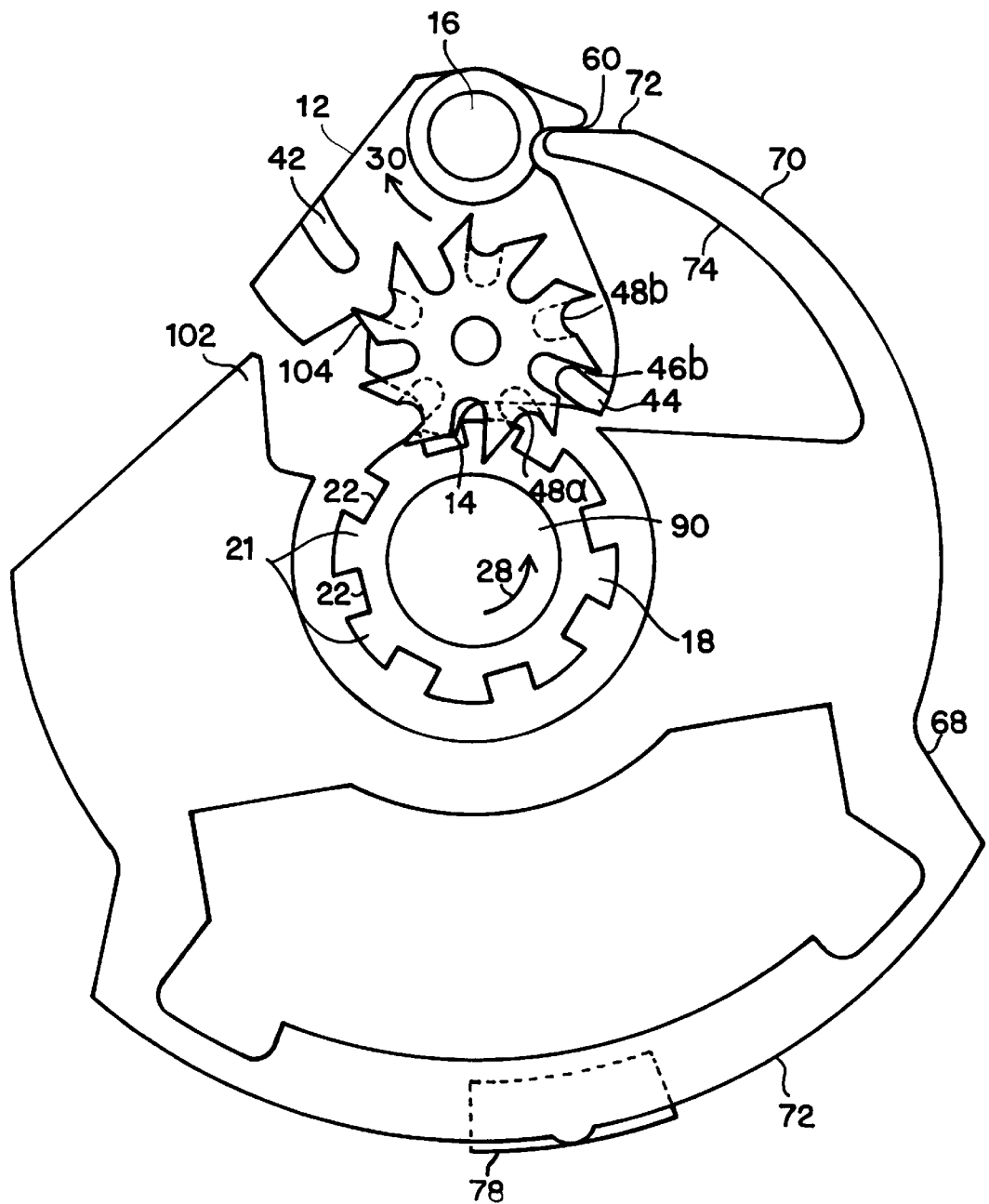
FIG. 13B is a back plan view of the ratchet assembly in a configuration wherein it is transitioning to a configuration wherein retraction of line cord is permitted.

When the line cord is again released, and spool shaft 90 is permitted to rotate in the direction of arrow 28 as shown in FIG. 13A, pawl assembly 12 will again arcuately rotate in the direction of arrow 30, and combination drive and locking pin 44 will re-engage with ratchet gear 40, except this time it will fully engage in drive slot 46b permitting pawl assembly 12 to fully rotate to the third position, as was originally shown in FIGS. 4A and 4B.

Thus, it can be seen that pawl assembly 12 can always transition from the third position back to the first position, and each time it does, drive pin 42 will cause rotation of ratchet gear 40 to position sequentially either a drive slot, such as 46a or 46b or a combination drive and locking slot, such as 48a or 48b in a position where they will be engaged by combination drive and locking pin 44.

Hence, one can always withdraw the line cord off of the spool, and when the line cord is allowed to retract, it will either lock pawl assembly 12 in the second position where it is locked in engagement with pawl gear 18, or it will permit the pawl assembly 12 to transition back to the third position to permit full retraction of the line spool cord. If the pawl assembly 12 locks in the second position, all the operator must do is pull out the cord a little bit to rotate pawl assembly 12 back to the first position, and let the cord back in again to transition pawl assembly 12 back to the third position to permit full retraction of the line cord.

Figure 14:
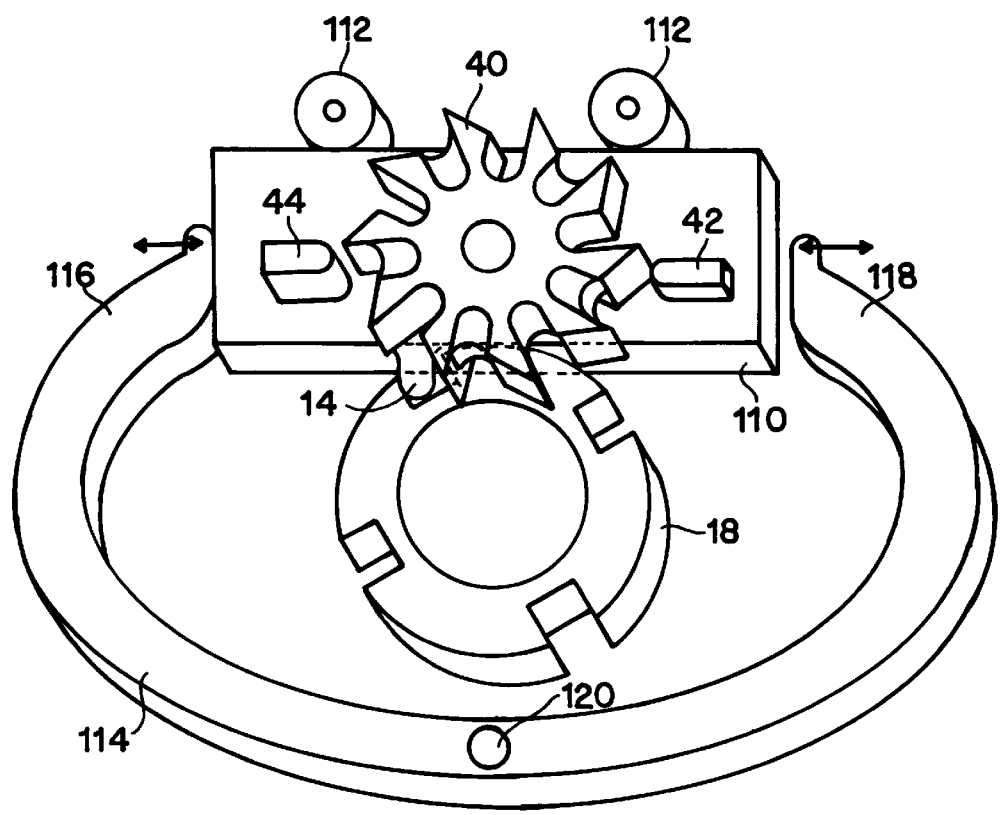
FIG. 14 is a perspective representational view of a second embodiment of a mechanically driven ratchet assembly.

FIG. 14 discloses a second preferred embodiment which does not use the pendulum configuration for pawl assembly 12, but rather pawl assembly slide 110, which is operable to slide back and forth between the first and third positions and held in place by slide pins 112. In this second preferred embodiment, ratchet gear 40 is configured exactly the same as it is in the first preferred embodiment, as are drive pin 42 and combination drive and locking pin 44. Spring biasing for pawl assembly slide 110 is provided by means of spring assembly 114, which is held in position by means of spring assembly 120. In this configuration, first spring contact point 116 provides a spring loaded force for sliding pawl assembly slide 110 in the direction from the first position in which it is shown in FIG. 14 towards the third position, and when pawl assembly slide 110 is in the third position, not shown in FIG. 14, second spring contact point 18 provides the biasing force to urge pawl assembly slide 110 back toward the first position.

Figure 15:
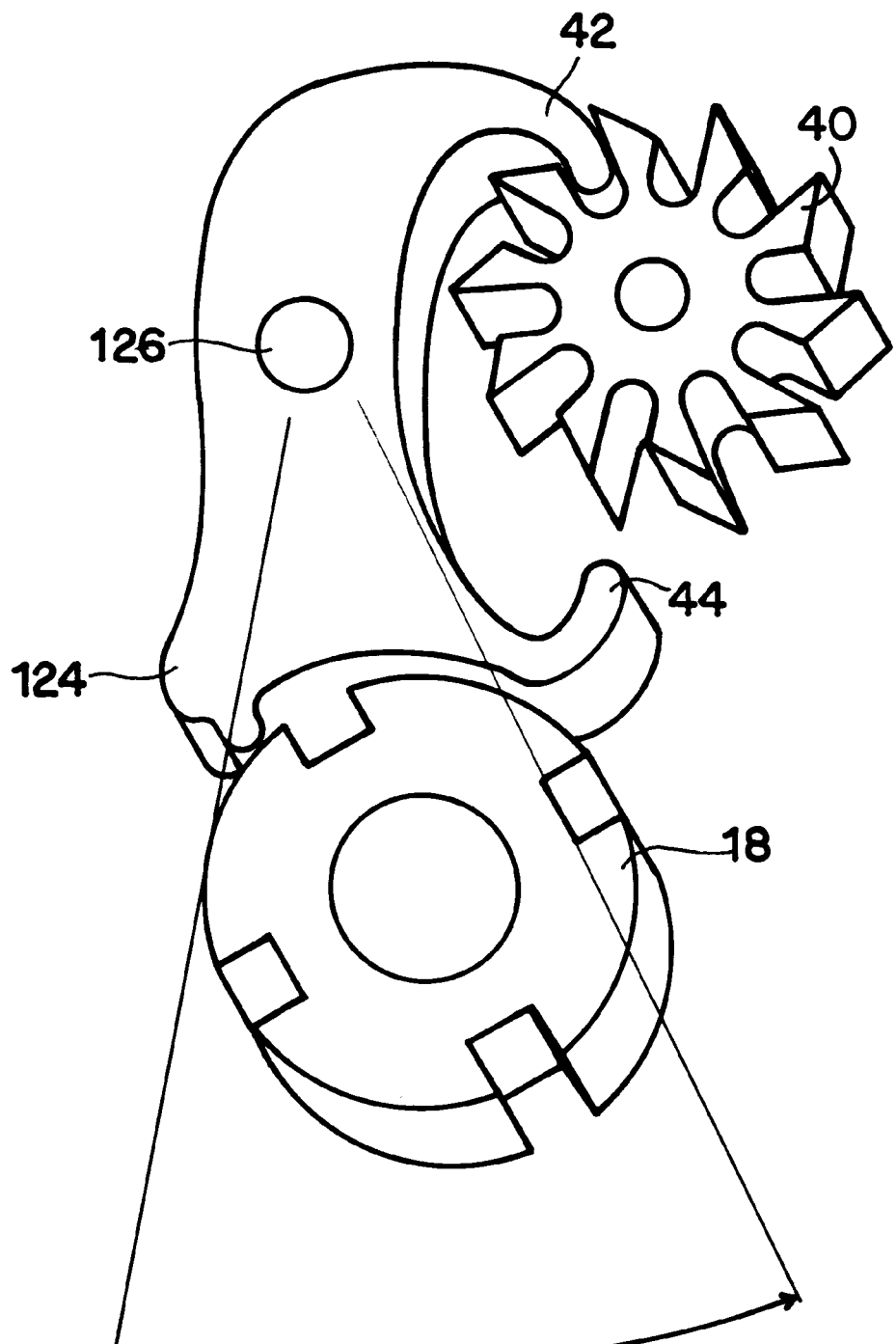
FIG. 15 is a perspective representational view of a third embodiment of a mechanically driven ratchet assembly.

FIG. 15 discloses yet another, third embodiment, in which crescent shaped pawl assembly 124 is rotatably mounted for limited arcuate rotation by means of pin 126 above ratchet gear 18, and in a position wherein drive pin 42 and combination drive and locking pin 44 can interact with ratchet gear 40, as previously described. Crescent shaped pawl assembly 124 transitions back and forth between the first and third positions and alternately stops in the second, intermediate position. Spring biasing is provided in essentially the same manner as it is for the first and second preferred embodiment.

While there is shown and described the present preferred embodiment of the invention, it is to be distinctly understood that this invention is not limited thereto but may be variously embodied to practice within the scope of the following claims.

I claim:

1. A mechanically driven ratchet assembly which comprises:

a rotationally biased shaft capable of driven rotation against said rotational bias in a first direction, and rotation, induced by said rotational bias, in a second direction;

a pawl gear attached to said rotationally biased shaft;

a free wheeling ratchet gear having a plurality of alternating drive slots and combination drive and locking slots; and a pawl assembly having a pawl tooth, a drive pin and a combination drive and locking pin, moveably held in relation to said pawl gear and said ratchet gear, with, said pawl tooth configured for engagement with the pawl gear for moving said pawl assembly when said rotationally biased shaft is rotated in said first direction, to a first position wherein said pawl tooth is not engaged with said pawl gear, and when said rotationally biased shaft is rotated in the second direction, to a second position wherein said pawl tooth remains in engagement with said pawl gear, or to a third position wherein said pawl tooth is not engaged with said pawl gear, said drive pin being configured and positioned upon said pawl assembly for engagement with said ratchet gear drive slots and combination drive and locking slots when said pawl assembly moves in said first direction to rotate said ratchet gear to position, alternatively, either a drive slot or a combination drive and locking slot, in a position where said combination drive and locking pin will engage the positioned slot when said pawl assembly is moved from the first position in the second direction towards the third position, and wherein said combination drive and lock pin is configured to engage either a combination drive and locking slot in said ratchet gear and thereby hold said pawl assembly in the second position, or to engage a drive slot to permit movement of said pawl assembly to the third position.

2. The mechanically driven ratchet assembly of claim 1 which further comprises:

means for biasing said pawl assembly for movement towards the third position when said pawl assembly is in the first position; and means for biasing said pawl assembly for movement towards the first position when said pawl assembly is in the third position.

3. A mechanically driven ratchet assembly which comprises:

a rotationally biased shaft capable of driven rotation against said rotational bias in a first direction, and rotation, induced by said rotational bias, in a second direction;

a pawl gear attached to said rotationally biased shaft;

a pawl assembly having a pawl tooth, a drive pin and a combination drive and locking pin, said pawl tooth configured for engagement with said pawl gear for moving said pawl assembly, when said rotationally biased shaft is rotated in said first direction, to a first position wherein said pawl tooth is not engaged with said pawl gear, and when said rotationally biased shaft is rotated in the second direction, to a second position wherein said pawl tooth remains in engagement with said pawl gear, or to a third position wherein said pawl tooth is not engaged with said pawl gear;

a free wheeling ratchet gear having a plurality of alternating drive slots and combination drive and locking slots, said drive slots configured to receive a drive pin inserted to a sufficient distance to permit movement of said pawl assembly from the third position to the first position and to receive a combination drive and locking pin inserted to a sufficient distance to permit movement of said pawl assembly from the first position to the third position, and said combination drive and locking slots configured to receive said drive pin inserted to a sufficient distance to permit movement of said pawl assembly from the third position to the first position and to receive said combination drive and locking pin inserted only to a sufficient distance to permit movement of said pawl assembly from the first position to the second position;

said drive pin being configured and positioned upon said pawl assembly for engagement with, and insertion into, said ratchet gear drive slots and combination drive and locking slots, when said pawl assembly moves in said first direction towards the first position, to rotate said ratchet gear to a position wherein the combination drive and lock pin will alternately engage either a drive slot or a combination drive and locking slot when said pawl assembly is moved in the second direction from the first position towards the third position, and wherein said combination drive and locking pin is configured and positioned to engage either a combination drive and locking slot in said ratchet gear and thereby hold said pawl assembly in the second position and preventing its further movement towards the third position, or to engage a drive slot to permit movement of the pawl assembly to the third position.

4. The mechanically driven ratchet assembly of claim 3 which further comprises:

means for biasing said pawl assembly for movement towards the third position when said pawl assembly is in the first position; and means for biasing said pawl assembly for movement towards the first position when said pawl assembly is in the third position.

5. The mechanically driven ratchet assembly of claim 3 wherein said plurality of alternating drive slots and combination drive and locking slots of said ratchet gear are interspersed between rotational drive surfaces; and said drive pin is configured and positioned upon said pawl assembly for engagement with said rotational drive surfaces, and insertion into said drive slots and combination drive and locking slots, when said pawl assembly moves in said first direction towards the first position, to rotate said ratchet gear to a position wherein said combination drive and locking pin will alternately engage either a drive slot or a combination drive and locking slot when said pawl assembly is moved in the second direction from the first position towards the third position, and wherein said combination drive and lock pin is configured and positioned to first engage a rotational drive surface and then either a combination drive and locking slot in said ratchet gear and thereby hold said pawl assembly in the second position and prevent further movement towards the third position, or for insertion into a drive slot to permit movement of said pawl assembly to the third position.

6. The mechanically driven ratchet assembly of claim 3 wherein the combination drive and locking slots each further comprises an outer first portion of said slot configured to receive both the drive pin and the combination drive and locking pin, and a second inner portion configured to receive said drive pin and not to receive said combination drive and locking pin.

7. A mechanically driven ratchet assembly which comprises:

a rotationally biased shaft capable of driven rotation against said rotational bias in a first direction, and rotation, induced by said rotational bias, in a second direction;

a pawl gear attached to said rotationally biased shaft;

a free wheeling ratchet gear having a plurality of alternating drive slots and combination drive and locking slots;

a pendulum pawl assembly having a pawl tooth, a drive pin and a combination drive and locking pin, rotably held for arcuate rotation of said pawl tooth, drive pin and said combination drive and locking pin, with said pawl tooth configured for engagement with the pawl gear for arcuately rotating said pendulum pawl assembly, when said rotationally biased shaft is rotated in said first direction, to a first position wherein said pawl tooth is not engaged with said pawl gear, and when said rotationally biased shaft is rotated in the second direction, to a second position wherein said pawl tooth remains in engagement with said pawl gear, or to a third position wherein said pawl tooth is not engaged with said pawl gear, said drive pin being configured and positioned upon said pendulum pawl assembly for engagement with said ratchet gear drive slots and combination drive and locking slots when said pawl assembly moves in said first direction to rotate said ratchet gear to position, alternatively, either a drive slot or a combination drive and locking slot, in a position where said combination drive and locking pin will engage the positioned slot when said pawl assembly is moved from the first position in the second direction towards the third position, and wherein said combination drive and locking pin is configured to engage either a combination drive and locking slot in said ratchet gear and thereby hold the pendulum pawl assembly in the second position, or engage a drive slot to permit rotation of the pendulum pawl assembly to the third position.

8. The mechanically driven ratchet assembly of claim 7 which further comprises:

means for biasing said pendulum pawl assembly for arcuate rotation towards the third position when said pendulum pawl assembly is in the first position; and means for biasing said pendulum pawl assembly for arcuate rotation towards the first position when said pendulum pawl assembly is in the third position.

9. The mechanically driven ratchet assembly of claim 7 wherein said plurality of alternating drive slots and combination drive and locking slots of said ratchet gear are interspersed between rotational drive surfaces; and said drive pin is configured and positioned upon said pawl assembly for engagement with said rotational drive surfaces, and insertion into said drive slots and combination drive and locking slots, when said pawl assembly moves in said first direction towards the first position, to rotate said ratchet gear to a position wherein said combination drive and locking pin will alternately engage either a drive slot or a combination drive and locking slot when said pawl assembly is moved in the second direction from the first position towards the third position, and wherein said combination drive and locking pin is configured and positioned to first engage a rotational drive surface and then either a combination drive and locking slot in said ratchet gear and thereby hold said pawl assembly in the second position and prevent further movement towards the third position, or for insertion into a drive slot to permit movement of said pawl assembly to the third position.

10. The mechanically driven ratchet assembly of claim 7 wherein the combination drive and locking slots each further comprises an outer first portion of said slot being configured to receive both the drive pin and the combination drive and locking pin, and a second inner portion being configured to receive said drive pin and not to receive said combination drive and locking pin.

* * * * *